US009286145B2

(12) United States Patent
Archer et al.

(10) Patent No.: US 9,286,145 B2
(45) Date of Patent: *Mar. 15, 2016

(54) PROCESSING DATA COMMUNICATIONS EVENTS BY AWAKENING THREADS IN PARALLEL ACTIVE MESSAGING INTERFACE OF A PARALLEL COMPUTER

(71) Applicant: INTERNATIONAL BUSINESS MACHINES CORPORATION, Armonk, NY (US)

(72) Inventors: Charles J. Archer, Rochester, MN (US); Michael A. Blocksome, Rochester, MN (US); Joseph D. Ratterman, Seattle, WA (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 697 days.

This patent is subject to a terminal disclaimer.

(21) Appl. No.: 13/672,054

(22) Filed: Nov. 8, 2012

(65) Prior Publication Data

US 2013/0074098 A1   Mar. 21, 2013

Related U.S. Application Data

(63) Continuation of application No. 12/943,105, filed on Nov. 10, 2010, now Pat. No. 8,566,841.

(51) Int. Cl.
*G06F 9/54* (2006.01)
*G06F 15/163* (2006.01)
(Continued)

(52) U.S. Cl.
CPC .............. *G06F 9/546* (2013.01); *G06F 9/3851* (2013.01); *G06F 9/52* (2013.01); *G06F 9/54* (2013.01); *G06F 9/541* (2013.01); *G06F 9/542* (2013.01)

(58) Field of Classification Search
CPC ............................................. G06F 9/54–9/546
See application file for complete search history.

(56) References Cited

U.S. PATENT DOCUMENTS 4,715,032 A   12/1987   Nilsson
4,843,540 A    6/1989   Stolfo
(Continued)

FOREIGN PATENT DOCUMENTS

EP      1835414 A2    9/2007
JP   2003317487 A   11/2003
WO   WO 2007/057281 A1   5/2007

OTHER PUBLICATIONS

Faraj, A., et al. "Automatic Generation and Tuning of MPI Collective Communication Routines", ICS' 05, Jun. 20-22, Boston, MA, USA. pp. 393-402, ACM.
(Continued)

*Primary Examiner* — Kenneth Kim
(74) *Attorney, Agent, or Firm* — Edward J. Lenart; Grant A. Johnson; Kennedy Lenart Spraggins LLP

(57) ABSTRACT

Processing data communications events in a parallel active messaging interface ('PAMI') of a parallel computer that includes compute nodes that execute a parallel application, with the PAMI including data communications endpoints, and the endpoints are coupled for data communications through the PAMI and through other data communications resources, including determining by an advance function that there are no actionable data communications events pending for its context, placing by the advance function its thread of execution into a wait state, waiting for a subsequent data communications event for the context; responsive to occurrence of a subsequent data communications event for the context, awakening by the thread from the wait state; and processing by the advance function the subsequent data communications event now pending for the context.

8 Claims, 14 Drawing Sheets

(51) Int. Cl.
   *G06F 9/38* (2006.01)
   *G06F 9/52* (2006.01)

(56) References Cited

U.S. PATENT DOCUMENTS

| | | |
|---|---|---|
| 5,101,480 A | 3/1992 | Shin et al. |
| 5,105,424 A | 4/1992 | Flaig et al. |
| 5,333,279 A | 7/1994 | Dunning |
| 5,377,333 A | 12/1994 | Nakagoshi et al. |
| 5,513,371 A | 4/1996 | Cypher et al. |
| 5,541,914 A | 7/1996 | Krishnamoorthy et al. |
| 5,590,334 A | 12/1996 | Saulpaugh et al. |
| 5,617,538 A | 4/1997 | Heller |
| 5,668,815 A | 9/1997 | Gittinger et al. |
| 5,721,828 A | 2/1998 | Frisch |
| 5,822,604 A | 10/1998 | Ogasawara et al. |
| 5,822,605 A | 10/1998 | Higuchi et al. |
| 5,826,049 A | 10/1998 | Ogata et al. |
| 5,832,215 A | 11/1998 | Kato et al. |
| 5,864,712 A | 1/1999 | Carmichael et al. |
| 5,875,329 A | 2/1999 | Shan |
| 5,878,241 A | 3/1999 | Wilkinson et al. |
| 5,892,923 A | 4/1999 | Yasuda et al. |
| 5,937,202 A | 8/1999 | Crosetto et al. |
| 5,949,988 A | 9/1999 | Feisullin et al. |
| 5,958,017 A | 9/1999 | Scott et al. |
| 6,000,024 A | 12/1999 | Maddox |
| 6,038,651 A | 3/2000 | VanHuben et al. |
| 6,067,609 A | 5/2000 | Meeker et al. |
| 6,076,131 A | 6/2000 | Nugent |
| 6,108,692 A | 8/2000 | Van Seters et al. |
| 6,212,617 B1 | 4/2001 | Hardwick |
| 6,272,548 B1 | 8/2001 | Cotter et al. |
| 6,289,424 B1 | 9/2001 | Stevens |
| 6,292,822 B1 | 9/2001 | Hardwick |
| 6,334,138 B1 | 12/2001 | Kureya |
| 6,473,849 B1 | 10/2002 | Keller et al. |
| 6,480,885 B1 | 11/2002 | Olivier |
| 6,647,438 B1 | 11/2003 | Conner et al. |
| 6,691,101 B2 | 2/2004 | MacNicol et al. |
| 6,714,552 B1 | 3/2004 | Cotter |
| 6,742,063 B1 | 5/2004 | Hellum et al. |
| 6,748,451 B2 | 6/2004 | Woods et al. |
| 6,754,211 B1 | 6/2004 | Brown |
| 6,834,301 B1 | 12/2004 | Hanchett |
| 6,914,606 B2 | 7/2005 | Amemiya et al. |
| 6,954,806 B2 | 10/2005 | Yosimoto et al. |
| 6,982,960 B2 | 1/2006 | Lee et al. |
| 7,010,576 B2 | 3/2006 | Bae |
| 7,073,043 B2 | 7/2006 | Arimilli et al. |
| 7,133,359 B2 | 11/2006 | Weis |
| 7,143,392 B2 | 11/2006 | Ii et al. |
| 7,171,484 B1 | 1/2007 | Krause et al. |
| 7,203,743 B2 | 4/2007 | Shah-Heydari |
| 7,263,698 B2 | 8/2007 | Wildhagen et al. |
| 7,284,033 B2 | 10/2007 | Jhanji |
| 7,352,739 B1 | 4/2008 | Rangarajan et al. |
| 7,363,474 B2 | 4/2008 | Rodgers et al. |
| 7,487,501 B2 | 2/2009 | Silvera et al. |
| 7,496,699 B2 | 2/2009 | Pope et al. |
| 7,509,244 B1 | 3/2009 | Shakeri et al. |
| 7,539,989 B2 | 5/2009 | Blackmore et al. |
| 7,555,566 B2 | 6/2009 | Blumrich et al. |
| 7,571,439 B1 | 8/2009 | Rabinovici et al. |
| 7,587,516 B2 | 9/2009 | Bhanot et al. |
| 7,590,983 B2 | 9/2009 | Neiman et al. |
| 7,600,095 B2 | 10/2009 | Archer et al. |
| 7,613,134 B2 | 11/2009 | Rangarajan et al. |
| 7,640,315 B1 | 12/2009 | Meyer et al. |
| 7,664,110 B1 | 2/2010 | Lovett et al. |
| 7,673,011 B2 | 3/2010 | Archer et al. |
| 7,697,443 B2 | 4/2010 | Archer et al. |
| 7,707,366 B2 | 4/2010 | Tagawa |
| 7,725,329 B2 | 5/2010 | Kil et al. |
| 7,739,451 B1 | 6/2010 | Wiedenman et al. |
| 7,774,448 B2 | 8/2010 | Shah-Heydari |
| 7,796,527 B2 | 9/2010 | Archer et al. |
| 7,808,930 B2 | 10/2010 | Boers et al. |
| 7,835,378 B2 | 11/2010 | Wijnands et al. |
| 7,853,639 B2 | 12/2010 | Archer et al. |
| 7,936,681 B2 | 5/2011 | Gong et al. |
| 7,948,999 B2 | 5/2011 | Blocksome et al. |
| 7,974,221 B2 | 7/2011 | Tamassia et al. |
| 7,984,448 B2 | 7/2011 | Almasi et al. |
| 7,991,857 B2 | 8/2011 | Berg et al. |
| 8,090,797 B2 | 1/2012 | Chinta et al. |
| 8,131,825 B2 | 3/2012 | Nord et al. |
| 8,136,104 B2 | 3/2012 | Papakipos et al. |
| 8,161,268 B2 | 4/2012 | Faraj |
| 8,161,480 B2 | 4/2012 | Archer et al. |
| 8,326,943 B2 | 12/2012 | Chinta et al. |
| 8,365,186 B2 | 1/2013 | Faraj et al. |
| 8,436,720 B2 | 5/2013 | Archer et al. |
| 8,565,089 B2 | 10/2013 | Archer et al. |
| 2002/0016901 A1 | 2/2002 | Carvey et al. |
| 2002/0054051 A1 | 5/2002 | Ladd |
| 2002/0065984 A1 | 5/2002 | Thompson et al. |
| 2002/0091819 A1 | 7/2002 | Melchione et al. |
| 2002/0144027 A1 | 10/2002 | Schmisseur |
| 2003/0041173 A1 | 2/2003 | Hoyle |
| 2003/0182376 A1 | 9/2003 | Smith |
| 2003/0188054 A1 | 10/2003 | Yosimoto et al. |
| 2003/0212877 A1 | 11/2003 | Dally et al. |
| 2003/0225852 A1 | 12/2003 | Bae |
| 2004/0034678 A1 | 2/2004 | Kuszmaul et al. |
| 2004/0073590 A1 | 4/2004 | Bhanot et al. |
| 2004/0107387 A1 | 6/2004 | Larsson et al. |
| 2005/0094577 A1 | 5/2005 | Ashwood-Smith |
| 2005/0135395 A1 | 6/2005 | Fan et al. |
| 2005/0165980 A1 | 7/2005 | Clayton et al. |
| 2005/0243711 A1 | 11/2005 | Alicherry et al. |
| 2006/0156312 A1 | 7/2006 | Supalov |
| 2006/0168359 A1 | 7/2006 | Bissessur et al. |
| 2006/0179181 A1 | 8/2006 | Seong |
| 2006/0182137 A1 | 8/2006 | Zhou et al. |
| 2006/0277323 A1 | 12/2006 | Joublin et al. |
| 2006/0282838 A1 | 12/2006 | Gupta et al. |
| 2007/0110063 A1 | 5/2007 | Tang et al. |
| 2007/0174558 A1 | 7/2007 | Jia et al. |
| 2007/0226686 A1 | 9/2007 | Beardslee et al. |
| 2007/0242611 A1 | 10/2007 | Archer et al. |
| 2007/0245122 A1 | 10/2007 | Archer et al. |
| 2007/0245163 A1 | 10/2007 | Lu et al. |
| 2007/0288935 A1 | 12/2007 | Tannenbaum et al. |
| 2007/0294666 A1 | 12/2007 | Papakipos et al. |
| 2007/0294681 A1 | 12/2007 | Tuck et al. |
| 2008/0022079 A1 | 1/2008 | Archer et al. |
| 2008/0077366 A1 | 3/2008 | Neuse et al. |
| 2008/0109569 A1 | 5/2008 | Leonard et al. |
| 2008/0127146 A1 | 5/2008 | Liao et al. |
| 2008/0155249 A1 | 6/2008 | Backof et al. |
| 2008/0177505 A1 | 7/2008 | Volponi |
| 2008/0201603 A1 | 8/2008 | Ritz et al. |
| 2008/0250325 A1 | 10/2008 | Feigenbaum et al. |
| 2008/0263320 A1 | 10/2008 | Archer et al. |
| 2008/0263329 A1 | 10/2008 | Archer et al. |
| 2008/0270563 A1 | 10/2008 | Blocksome et al. |
| 2008/0273543 A1 | 11/2008 | Blocksome et al. |
| 2008/0288949 A1 | 11/2008 | Bohra et al. |
| 2008/0301683 A1 | 12/2008 | Archer et al. |
| 2009/0006662 A1 | 1/2009 | Chen et al. |
| 2009/0006663 A1 | 1/2009 | Archer et al. |
| 2009/0006808 A1 | 1/2009 | Blumrich et al. |
| 2009/0019218 A1 | 1/2009 | Sinclair et al. |
| 2009/0019258 A1 | 1/2009 | Shi |
| 2009/0037377 A1 | 2/2009 | Archer et al. |
| 2009/0037511 A1 | 2/2009 | Almasi et al. |
| 2009/0037707 A1 | 2/2009 | Blocksome |
| 2009/0040946 A1 | 2/2009 | Archer et al. |
| 2009/0043910 A1 | 2/2009 | Barsness et al. |
| 2009/0052462 A1 | 2/2009 | Archer et al. |
| 2009/0055474 A1 | 2/2009 | Archer et al. |
| 2009/0063815 A1 | 3/2009 | Arimilli et al. |
| 2009/0064140 A1 | 3/2009 | Arimilli et al. |

(56) References Cited

U.S. PATENT DOCUMENTS

| | | |
|---|---|---|
| 2009/0064176 A1 | 3/2009 | Ohly et al. |
| 2009/0067334 A1 | 3/2009 | Archer et al. |
| 2009/0154486 A1 | 6/2009 | Archer et al. |
| 2009/0196361 A1 | 8/2009 | Chan et al. |
| 2009/0240838 A1 | 9/2009 | Berg et al. |
| 2009/0240915 A1 | 9/2009 | Faraj |
| 2009/0245134 A1 | 10/2009 | Archer et al. |
| 2009/0248712 A1 | 10/2009 | Yuan |
| 2009/0259713 A1 | 10/2009 | Blumrich et al. |
| 2009/0292905 A1 | 11/2009 | Faraj |
| 2009/0307467 A1 | 12/2009 | Faraj |
| 2009/0310544 A1 | 12/2009 | Jain et al. |
| 2009/0319621 A1 | 12/2009 | Barsness et al. |
| 2010/0017420 A1 | 1/2010 | Archer et al. |
| 2010/0023631 A1 | 1/2010 | Archer et al. |
| 2010/0057738 A1 | 3/2010 | Ianni |
| 2010/0082788 A1 | 4/2010 | Mundy |
| 2010/0122268 A1 | 5/2010 | Jia |
| 2010/0185718 A1 | 7/2010 | Archer et al. |
| 2010/0191911 A1 | 7/2010 | Heddes et al. |
| 2010/0274997 A1 | 10/2010 | Archer et al. |
| 2011/0010471 A1 | 1/2011 | Heidelberger et al. |
| 2011/0078692 A1 | 3/2011 | Nickolls et al. |
| 2011/0119673 A1 | 5/2011 | Bloch et al. |
| 2011/0125974 A1 | 5/2011 | Anderson |
| 2011/0153908 A1 | 6/2011 | Schaefer et al. |
| 2011/0179134 A1 | 7/2011 | Mayo et al. |
| 2011/0238950 A1 | 9/2011 | Archer et al. |
| 2011/0258245 A1 | 10/2011 | Blocksome et al. |
| 2011/0258627 A1 | 10/2011 | Faraj et al. |
| 2011/0267197 A1 | 11/2011 | Archer et al. |
| 2011/0270986 A1 | 11/2011 | Archer et al. |
| 2011/0289177 A1 | 11/2011 | Archer et al. |
| 2011/0296137 A1 | 12/2011 | Archer et al. |
| 2011/0296139 A1 | 12/2011 | Archer et al. |
| 2012/0066284 A1 | 3/2012 | Archer et al. |
| 2012/0117361 A1 | 5/2012 | Archer et al. |
| 2012/0179881 A1 | 7/2012 | Archer et al. |
| 2012/0197882 A1 | 8/2012 | Jensen |
| 2012/0216021 A1 | 8/2012 | Archer et al. |
| 2012/0317399 A1 | 12/2012 | Blocksome et al. |
| 2012/0331270 A1 | 12/2012 | Archer et al. |
| 2013/0042088 A1 | 2/2013 | Archer et al. |
| 2013/0042245 A1 | 2/2013 | Archer et al. |
| 2013/0042254 A1 | 2/2013 | Archer et al. |
| 2013/0067198 A1 | 3/2013 | Archer et al. |
| 2013/0073603 A1 | 3/2013 | Archer et al. |
| 2013/0073832 A1 | 3/2013 | Archer et al. |
| 2013/0074098 A1 | 3/2013 | Archer et al. |
| 2013/0080563 A1 | 3/2013 | Archer et al. |
| 2013/0086358 A1 | 4/2013 | Archer et al. |
| 2013/0111496 A1 | 5/2013 | Archer et al. |
| 2013/0151713 A1 | 6/2013 | Faraj |
| 2013/0173675 A1 | 7/2013 | Archer et al. |
| 2013/0212145 A1 | 8/2013 | Archer et al. |
| 2013/0212558 A1 | 8/2013 | Archer et al. |
| 2013/0212561 A1 | 8/2013 | Archer et al. |
| 2013/0246533 A1 | 9/2013 | Archer et al. |
| 2013/0290673 A1 | 10/2013 | Archer et al. |

OTHER PUBLICATIONS

Shrimali, G., et al., "Building Packet Buffers Using Interleaved Memories", (Proc. Sixth Workshop High Performance Switching and Routing (HPSR '05), May 2005, pp. 1-5, IEEE.

Ong, H., et al., "Kernel-level Single System Image for Petascale Computing", SIGOPS Oper. Syst. Rev., Apr. 2006, pp. 50-54, vol. 40, No. 2, ACM, New York, NY, USA.

Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.

Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.

Message Passing Interface Forum,"MPI: A Message-PassingInterface Standard Version 2.2", MPI Specification, Sep. 4, 2009, pp. 1-647, High Performance Computing Center Stuttgart (HLRS).

Vetter, J., et al., "Real-Time Performance Monitoring, Adaptive Control, and Interactive Steering of Computational Grids", International Journal of High Performance Computing Applications Winter 2000, pp. 357-366 (10 pages), vol. 14, No. 4, Sage Publications, Inc. Thousand Oaks, CA, USA.

Wikipedia, "Cache (computing)—Wikipedia, the free encyclopedia", Cache (computing), Edited by EmausBot, Jul. 22, 2011, Accessed Aug. 10, 2013, 6 pages.

Wikipedia, "Fuzzy logic—Wikipedia, the free encyclopedia", Fuzzy Logic, Edited by Jeff Silvers, Aug. 1, 2011, Accessed Aug. 10, 2013, 10 pages.

Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.

Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.

Tanenbaum, A., "Structured Computer Organization", Jan. 1984, pp. 1-5, Second Edition, Prentice-Hall, Inc., Englewood Cliffs, NJ, USA, ISBN: 0-13-854489-1.

Shaw, D., et al., Dado: A Tree-Structured Machine Architecture for Production Systems, AAAI-82 Proceedings, Jan. 1982, AAAI (www.aaai.org), pp. 242-246, AAAI Press.

Better Explained, "Swap two variables using XOR I BetterExplained", http://betterexplained.com/articles/swap-two-variables-using-xor, Accessed Jun. 4, 2011, pp. 1-8.

Rosenberg, J., "Dictionary of Computers, Information Processing & Telecommunications", Sep. 1987, pp. 1-5, Second Edition, John Wiley & Sons, New York, NY, USA.

Keller, R., et al., "MPI Development Tools and Applications for the Grid", In Workshop on Grid Applications and Programming Tools, Jun. 20, 2003, pp. 1-12, Innovative Computing Laboratory, Computer Science Department, University of Tennessee, Knoxville, TN, USA.

Edmonds et al., "AM++: A Generalized Active Message Framework", The 19th International Conference on Parallel Architectures and Compilation Techniques (PACT'10), Sep. 11-15, 2010, pp. 1-10, ACM, New York, NY USA. ISBN: 978-1-4503-0178-7.

Bangalore et al., "Extending the Message Passing Interface (MPI)", Proceedings of the 1994 Conference on Scalable Parallel Libraries, Oct. 12-14, 1994, pp. 106-118, IEEE Computer Society Press, USA. IEEE Digital Object Identifier: 10.1109/SPLC.1994.376998.

Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.

Fisher, A., et al., "Computing the Hough Transform on a Scan Line Array Processor [image processing]", IEEE Transactions on Pattern Analysis and Machine Intelligence, vol. 11, Issue: 3, Mar. 1989, pp. 262-265, IEEE Xplore.

Kodama, Y., et al., "Efficient MPI Collective Operations for Clusters in Long-and-Fast Networks", pp. 1-9, 2006 IEEE International Conference on Cluster Computing, Sep. 2006, IEEE.

Shaw, D., et al., DADO: A Tree-Structured Machine Architecture for Production Systems, AAAI-82 Proceedings, Month: Unknown, Year: 1982, AAAI (www.aaai.org), pp. 242-246, Columbia University.

Choi, H., et al., "An All-Reduce Operation in Star Networks Using All-to-All Broadcast Communication Patterns", V.S. Sunderam et al. (Eds.): ICCS 2005, LNCS 3514, pp. 419-426, 2005, Springer-Verlag Berlin Heidelberg 2005.

Patarasuk, P., et al., "Bandwidth Efficient All-reduce Operation on Tree Topologies", IEEE IPDPS Workshop on High-Level Parallel Programming Models and Supportive Environments, 2007, pp. 1-8, IEEE.

(56) References Cited

OTHER PUBLICATIONS

Bafna, R., et al, "Coprocessor Design to Support MPI Primitives in Configurable Mutliprocessors", Integration, the VLSI Journal, vol. 40, Issue: 3, pp. 235-252, Apr. 2007, Elsevier, URL: http://web.njit.edu/~ziavras/INTEGRATION-1.pdf.
Tang, H., et al., "Optimizing Threaded MPI Execution on SMP Clusters," ICS '01 Proceedings of the 15th International Conference on Supercomputing, Jun. 2001, pp. 381-392, ACM, New York, USA.
Notice of Allowance, U.S. Appl. No. 12/124,745, Mar. 6, 2013.
Final Office Action, U.S. Appl. No. 12/770,286, Jan. 29, 2013.
Final Office Action, U.S. Appl. No. 12/748,594, Mar. 22, 2013.
Notice of Allowance, U.S. Appl. No. 12/790,037, Mar. 15, 2013.
Final Office Action, U.S. Appl. No. 13/459,832, Jan. 4, 2013.
Notice of Allowance, U.S. Appl. No. 13/585,993, Jan. 31, 2013.
Office Action, U.S. Appl. No. 13/672,740, Apr. 2, 2013.
Office Action, U.S. Appl. No. 13/166,183, Feb. 24, 2014, pp. 1-22.
Office Action, U.S. Appl. No. 13/206,116, Feb. 7, 2014, pp. 1-32.
Sunggu Lee; Shin, K.G., "Interleaved all-to-all reliable broadcast on meshes and hypercubes," Parallel and Distributed Systems, IEEE Transactions on, vol. 5, pp. 449-458, May 1994.
Wikipedia. "Depth-First Search" May 5, 2007. http://web.archive.org/web/20070505212029/http://en.wikipedia.org/wiki/Depth-first_Search.
Bruck J., et al. Efficient Algorithms for all-to-all communications in multiportmessage-passing systems, Parallel and Distributed Systems, IEEE Transactions on, vol. 8, Issue: 11, pp. 1143-1156, Nov. 1997.
U.S. Appl. No. 60/271,124, filed Feb. 24, 2001, pp. 12-13, 27 and 42-43.
Office Action Dated Mar. 4, 2008 in U.S. Appl. No. 11/279,620.
Office Action Dated Sep. 3, 2008 in U.S. Appl. No. 11/279,620.
Office Action Dated Dec. 29, 2008 in U.S. Appl. No. 11/279,620.
Office Action Dated Apr. 3, 2009 in U.S. Appl. No. 11/769,367.
Office Action Dated Dec. 13, 2007 in U.S. Appl. No. 11/459,387.
Office Action Dated Jul. 11, 2008 in U.S. Appl. No. 11/459,387.
Office Action Dated Mar. 18, 2009 in U.S. Appl. No. 11/459,387.
Sistare, et al.; Optimization of MPI collectives on clusters of large-scale SMP's, Conference on High Performance Networking and Computing, Proceedings of the 1999 ACM/IEEE conference on Supercomputing; 1999.
Tanenbaum, Structured Computer Organization, Second Edition, Prentice-Hall, Inc., 1984.
Rosenberg; Dictionarty of Computers, Information Processing & Telecommunications, Second Edition, John Wiley & Sons, 1987.
Office Action, U.S. Appl. No. 13/665,985, Apr. 25, 2014, pp. 1-19.
Stolfo, et al., DADO: A Tree-Structured Machine Architecture for Production Systems, AAAI-82 Proceedings, 1982, AAAI (www.aaai.org), pp. 242-246, Columbia University.
Office Action, U.S. Appl. No. 12/748,594, Sep. 14, 2012, pp. 1-53.
Notice of Allowance, U.S. Appl. No. 12/943,105, Jun. 17, 2013, pp. 1-22.
"Swap Two Variables Using XOR", BetterExplained.com (online), URL: http://betterexplained.com/articles/swap-two-variables-using-xor/, accessed Jan. 16, 2007, 11 pages.

PROCESSING DATA COMMUNICATIONS EVENTS BY AWAKENING THREADS IN PARALLEL ACTIVE MESSAGING INTERFACE OF A PARALLEL COMPUTER

CROSS-REFERENCE TO RELATED APPLICATION

This application is a continuation application of and claims priority from U.S. patent application Ser. No. 12/943,105, filed on Nov. 10, 2010.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for processing data communications events in a parallel active messaging interface ('PAMI') of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

At the same time, the network link speed and number of links into and out of a compute node are dramatically increasing. IBM's BlueGene/Q™ supercomputer, for example, will have a five-dimensional torus network, which implements 10 bidirectional data communications links per compute node—and BlueGene/Q will support many thousands of compute nodes. To keep these links filled with data, DMA engines are employed, but increasingly, the HPC community is interested in latency. In traditional supercomputers with pared-down operating systems, there is little or no multi-tasking within compute nodes. When a data communications link is unavailable, a task typically blocks or 'spins' on a data transmission, in effect, idling a processor until a data transmission resource becomes available. In the trend for more powerful individual processors, such blocking or spinning has a bad effect on latency.

SUMMARY OF THE INVENTION

In the trend toward more powerful processors and decreasing message latency, it becomes desirable to implement an interrupt-oriented way of waiting on data communications resources. In this way, a thread that needs to wait on a communications resource can do so without blocking on an instruction or spinning its processor. The thread can move to a wait state, grant possession of the processor to another thread which can do useful work while the waiting thread is off the processor. When an interrupt notifies the waiting thread of resource availability or arrival of a new instruction or message, the waiting thread awakens, regains possession of the processor, and carries on with its data communications processing.

In this specification, example methods, apparatus, and computer program products are described for processing data communications events in a parallel active messaging interface ('PAMI') of a parallel computer that includes compute nodes that execute a parallel application, with the PAMI including data communications endpoints, and the endpoints are coupled for data communications through the PAMI and through other data communications resources, including determining by an advance function that there are no actionable data communications events pending for its context, placing by the advance function its thread of execution into a wait state, waiting for a subsequent data communications event for the context; responsive to occurrence of a subsequent data communications event for the context, awakening by the thread from the wait state; and processing by the advance function the subsequent data communications event now pending for the context.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
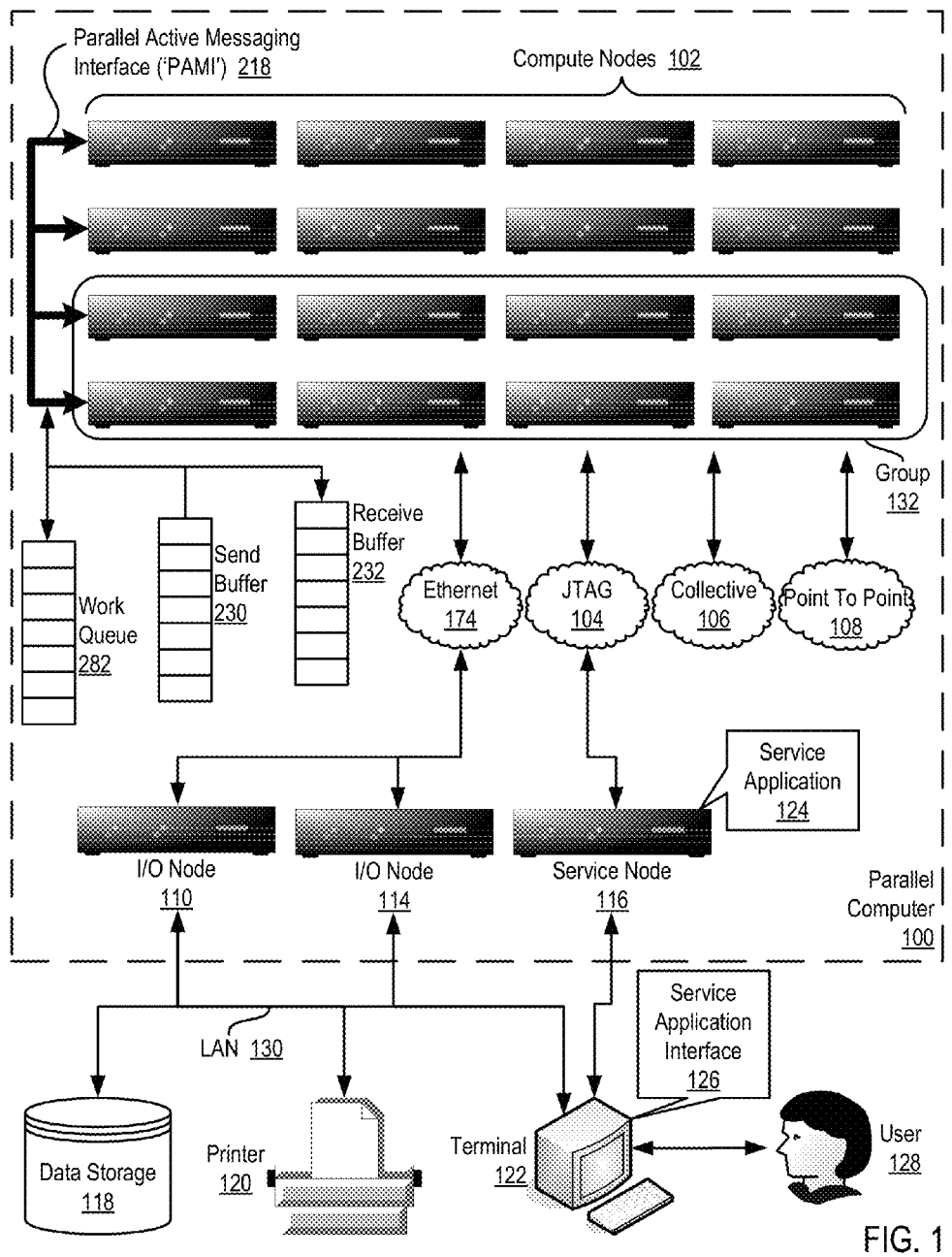
FIG. 1 sets forth a block and network diagram of an example parallel computer that processes data communications events in a parallel active messaging interface ('PAMI') according to embodiments of the present invention.

Example methods, computers, and computer program products for processing data communications events in a parallel active messaging interface ('PAMI') of a parallel computer according to embodiments of the present invention are described with reference to the accompanying drawings, beginning with FIG. 1. FIG. 1 sets forth a block and network diagram of an example parallel computer (100) that processes data communications events in a PAMI according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art applications messaging module or parallel communications library, an application-level messaging module of computer program instructions for data communications on parallel computers. Such an application messaging module is disposed in an application messaging layer in a data communications protocol stack. Examples of prior-art parallel communications libraries that may be improved for use with parallel computers that process data communications events in a PAMI of a parallel computer according to embodiments of the present invention include IBM's MPI library, the 'Parallel Virtual Machine' ('PVM') library, MPICH, OpenMPI, and LAM/MPI. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic, and the like, burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a canonical entity, an integer or objection oriented programming object, that represents in a PAMI a process of execution of the parallel application. That is, a task is typically implemented as an identifier of a particular instance of an application executing on a compute node, a compute core on a compute node, or a thread of execution on a multi-threading compute core on a compute node.

In the example of FIG. 1, the compute nodes (102), as well as PAMI endpoints on the compute nodes, are coupled for data communications through the PAMI (218) and through data communications resources such as send buffer (230), receive buffer (232), collective network (106), and point-to-point network (108). The parallel computer of FIG. 1 operates generally for processing data communications events in a PAMI of a parallel computer according to embodiments of the present invention by executing through the PAMI (218) a sequence of data communications instruction instructions for data transfers among endpoints. Data communications instructions are placed in work queues (e.g., 282) by post functions that are member methods of contexts in endpoints of the PAMI. The work of executing the data communications instructions is forwarded by advance functions, also member methods of contexts in endpoints of the PAMI. Any particular transfer is effected between two endpoints, an origin endpoint and a target endpoint.

Data communications instructions include SEND instructions, both rendezvous and eager, DMA PUT instructions, DMA GET instructions, and the like. Some data communications instructions, typically GETs and PUTs are one-sided DMA instructions in that there is no cooperation required from a target processor, no computation on the target side to complete such a PUT or GET because data is transferred directly to or from memory on the other side of the transfer. In this setting, the term 'target' is used for either PUT or GET. A PUT target receives data directly into its RAM from an origin endpoint. A GET target provides data directly from its RAM to the origin endpoint. Thus readers will recognize that the designation of an endpoint as an origin endpoint for a transfer is a designation of the endpoint that initiates execution of a DMA transfer instruction—rather than a designation of the direction of the transfer: PUT instructions transfer data from an origin endpoint to a target endpoint. GET instructions transfer data from a target endpoint to an origin endpoint.

The origin endpoint and the target endpoint in a transfer can be any two endpoints on any of the compute nodes (102), including two endpoints on the same compute node; a sequence of data communications instructions resides in a work queue of a context and results in data transfers between two endpoints, an origin endpoint and a target endpoint. Data communications instructions are 'active' in the sense that the instructions implement callback functions to advise of instruction dispatch and instruction completion, thereby reducing the quantity of acknowledgment traffic required on the network. Each such instruction effects a data transfer, from an origin endpoint to a target endpoint, through a controller and a some form of data communications resources, networks, shared memory segments, and the like.

As explained in more detail below, the parallel computer (100) in the example of FIG. 1 further operates generally for processing data communications events in a PAMI according to embodiments of the present invention by determining by an advance function executing in a thread of execution on a compute node that there are no actionable data communications events pending for the context; placing by the advance function the thread into a wait state, waiting for a subsequent data communications event for the context; responsive to occurrence of a subsequent data communications event for the context, awakening by the thread from the wait state; and processing by the advance function the subsequent data communications event now pending for the context.

The arrangement of compute nodes, networks, and I/O devices making up the example parallel computer illustrated in FIG. 1 are for explanation only, not for limitation of the present invention. Parallel computers capable of processing data communications events in a PAMI according to embodiments of the present invention may include additional nodes, networks, devices, and architectures, not shown in FIG. 1, as will occur to those of skill in the art. For ease of explanation, the parallel computer in the example of FIG. 1 is illustrated with only one work queue (282), one send buffer (230), and one receive buffer (232); readers will recognize, however, that practical embodiments of such a parallel computer will include many work queues, receive buffers, and send buffers. The parallel computer (100) in the example of FIG. 1 includes sixteen compute nodes (102); parallel computers that process data communications events in a PAMI according to some embodiments of the present invention include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Processing data communications events in a PAMI according to embodiments of the present invention is generally implemented on a parallel computer that includes a plurality of compute nodes. In fact, such computers may include thousands of such compute nodes, with a compute node typically executing at least one instance of a parallel application. Each compute node is in turn itself a computer composed of one or more computer processors, its own computer memory, and its own input/output ('I/O') adapters. For further explanation, therefore, FIG. 2 sets forth a block diagram of an example compute node (152) for use in a parallel computer that process data communications events in a PAMI according to embodiments of the present invention. The compute node (152) of FIG. 2 includes one or more computer processors (164) as well as random access memory ('RAM') (156). Each processor (164) can support multiple hardware compute cores (165), and each such core can in turn support multiple threads of execution, hardware threads of execution as well as software threads. Each processor (164) is connected to RAM (156) through a high-speed front side bus (161), bus adapter (194), and a high-speed memory bus (154)—and through bus adapter (194) and an extension bus (168) to other components of the compute node. Stored in RAM (156) is an application program (158), a module of computer program instructions that carries out parallel, user-level data processing using parallel algorithms.

Also stored RAM (156) is an application messaging module (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (216), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among PAMI endpoints and compute nodes through data communications networks or shared-memory transfers. In this approach, the application messaging module (216) exposes a traditional interface, such as MPI, to the application program (158) so that the application program can gain the benefits of a PAMI with no need to recode the application. As an alternative to coding from scratch, therefore, existing prior art application messaging modules may be improved to use the PAMI, existing modules that already implement a traditional interface. Examples of prior-art application messaging modules that can be improved to process data communications events in a PAMI according to embodiments of the present invention include such parallel communications libraries as the traditional 'Message Passing Interface' ('MPI') library, the 'Parallel Virtual Machine' ('PVM') library, MPICH, and the like.

Figure 2:
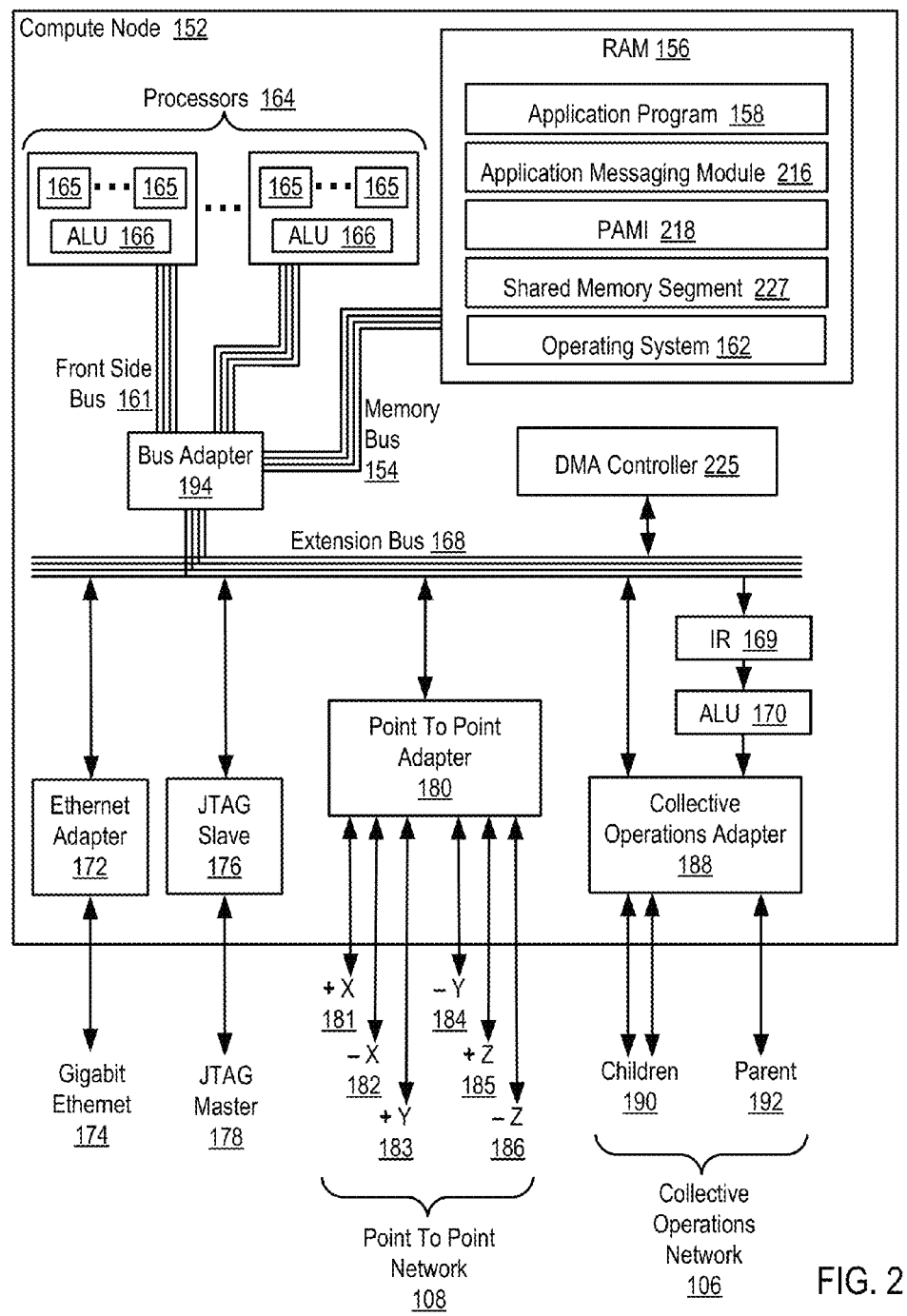
FIG. 2 sets forth a block diagram of an example compute node for use in parallel computers that process data communications events in a PAMI according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with and inclusions of hardware data communications resources. In fact, the PAMI can be implemented partly as software or firmware and hardware—or even, at least in some embodiments, entirely in hardware.

Also represented in RAM (156) in the example of FIG. 2 is a segment (227) of shared memory. In typical operation, the operating system (162) in this example compute node assigns portions of address space to each processor (164), and, to the extent that the processors include multiple compute cores (165), treats each compute core as a separate processor with its own assignment of a portion of core memory or RAM (156) for a separate heap, stack, memory variable storage, and so on. The default architecture for such apportionment of memory space is that each processor or compute core operates its assigned portion of memory separately, with no ability to access memory assigned to another processor or compute core. Upon request, however, the operating system grants to one processor or compute core the ability to access a segment of memory that is assigned to another processor or compute core, and such a segment is referred to in this specification as a 'segment of shared memory.'

In the example of FIG. 2, each processor or compute core has uniform access to the RAM (156) on the compute node, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory can be configured locally for one endpoint and remotely for another endpoint—or remotely from both endpoints of a communication. From the perspective of an origin endpoint transmitting data through a segment of shared memory that is configured remotely with respect to the origin endpoint, transmitting data through the segment of shared memory will appear slower that if the segment of shared memory were configured locally with respect to the origin endpoint—or if the segment were local to both the origin endpoint and the target endpoint. This is the effect of the architecture represented by the compute node (152) in the example of FIG. 2 with all processors and all compute cores coupled through the same bus to the RAM—that all accesses to segments of memory shared among processes or processors on the compute node are local—and therefore very fast.

Also stored in RAM (156) in the example compute node of FIG. 2 is an operating system (162), a module of computer program instructions and routines for an application program's access to other resources of the compute node. It is possible, in some embodiments at least, for an application program, an application messaging module, and a PAMI in a compute node of a parallel computer to run threads of execution with no user login and no security issues because each such thread is entitled to complete access to all resources of the node. The quantity and complexity of duties to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters for use in computers that process data communications events in a parallel active messaging interface ('PAMI') according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also used as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in processing data communications events in a PAMI according to embodiments of the present invention.

The data communications adapters in the example of FIG. 2 includes a Point To Point Adapter (180) that couples example compute node (152) for data communications to a data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), -x (182), +y (183), -y (184), +z (185), and -z (186). For ease of explanation, the Point To Point Adapter (180) of FIG. 2 as illustrated is configured for data communications in three dimensions, x, y, and z, but readers will recognize that Point To Point Adapters optimized for point-to-point operations in processing data communications events in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes a number of arithmetic logic units ('ALUs'). ALUs (166) are components of processors (164), and a separate ALU (170) is dedicated to the exclusive use of collective operations adapter (188) for use in performing the arithmetic and logical functions of reduction operations. Computer program instructions of a reduction routine in an application messaging module (216) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of an ALU (166) in a processor (164) or, typically much faster, by use of the dedicated ALU (170).

The example compute node (152) of FIG. 2 includes a direct memory access ('DMA') controller (225), a module of automated computing machinery that implements, through communications with other DMA engines on other compute nodes, or on a same compute node, direct memory access to and from memory on its own compute node as well as memory on other compute nodes. Direct memory access is a way of reading and writing to and from memory of compute nodes with reduced operational burden on computer processors (164); a CPU initiates a DMA transfer, but the CPU does not execute the DMA transfer. A DMA transfer essentially copies a block of memory from one compute node to another, or between RAM segments of applications on the same compute node, from an origin to a target for a PUT operation, from a target to an origin for a GET operation.

Figure 3A:
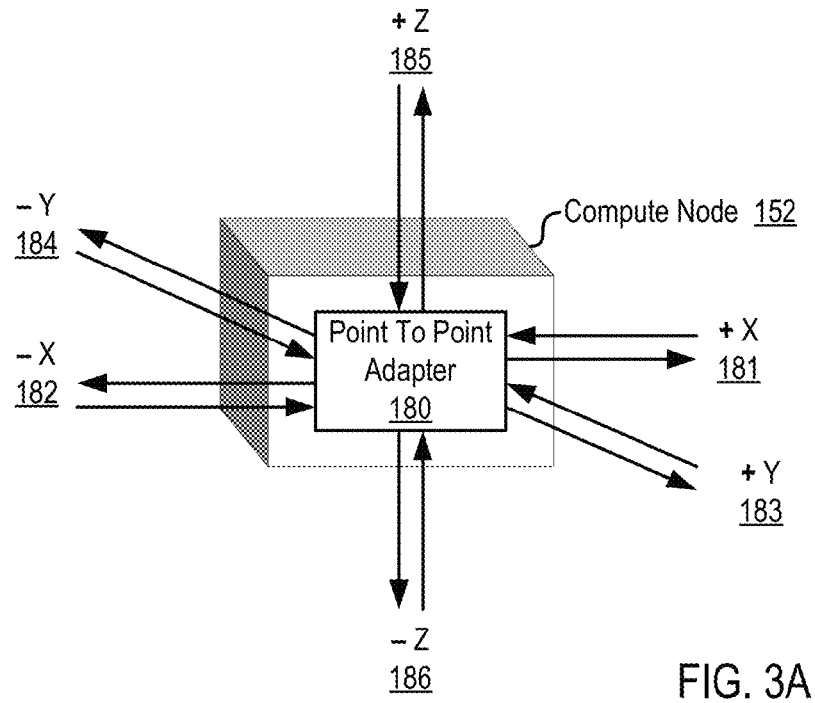
FIG. 3A illustrates an example Point To Point Adapter for use in parallel computers that process data communications events in a PAMI according to embodiments of the present invention.

For further explanation, FIG. 3A illustrates an example of a Point To Point Adapter (180) useful in parallel computers that process data communications events in a PAMI according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the -x direction (182) and to and from the next node in the +x direction (181). Point To Point Adapter (180) also provides data communication along a y-axis through four unidirectional data communications links, to and from the next node in the -y direction (184) and to and from the next node in the +y direction (183). Point To Point Adapter (180) in also provides data communication along a z-axis through four unidirectional data communications links, to and from the next node in the -z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for point-to-point operations in a parallel computer that processes data communications events according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
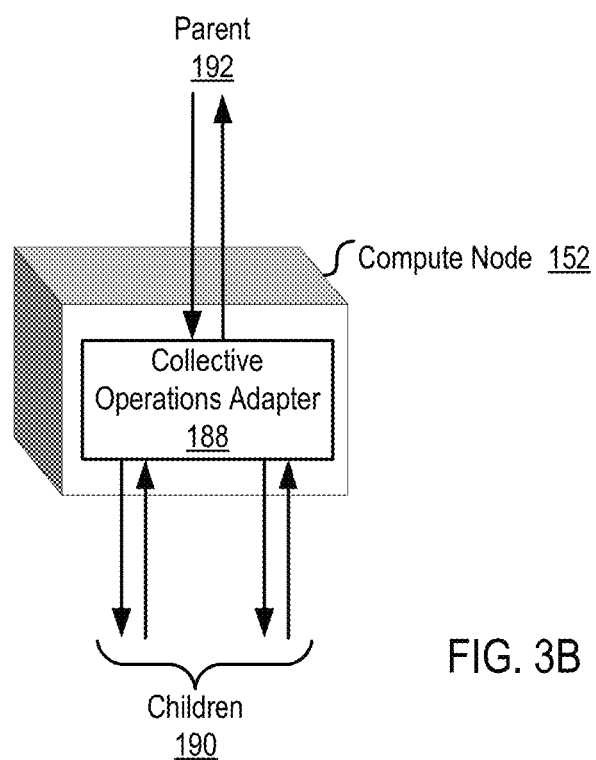
FIG. 3B illustrates an example Collective Operations Adapter for use in parallel computers that process data communications events in a PAMI according to embodiments of the present invention.

For further explanation, FIG. 3B illustrates an example of a Collective Operations Adapter (188) useful in a parallel computer that processes data communications events in a PAMI according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
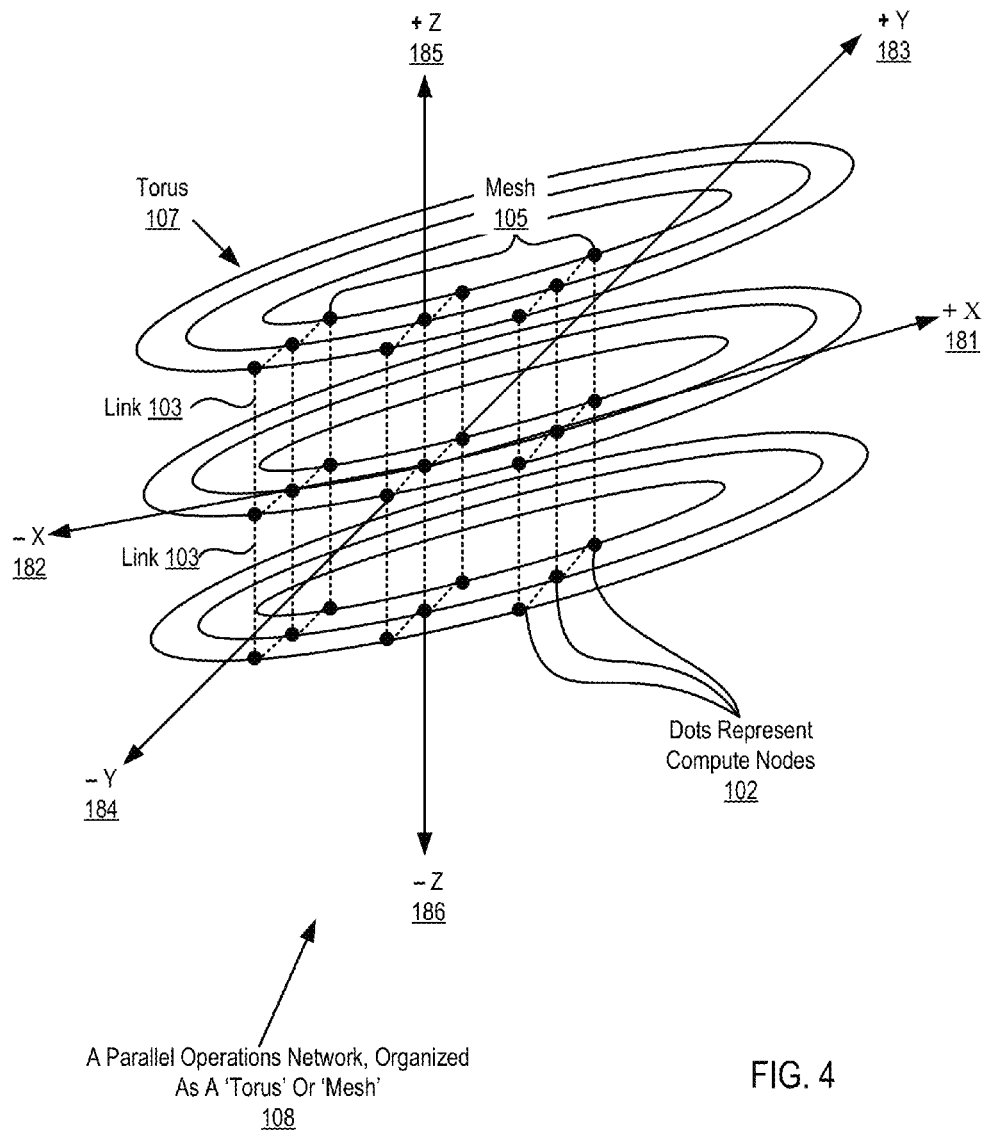
FIG. 4 illustrates an example data communications network optimized for point to point operations for use in parallel computers that process data communications events in a PAMI according to embodiments of the present invention.

For further explanation, FIG. 4 sets forth a line drawing illustrating an example data communications network (108) optimized for point-to-point operations useful in parallel computers that process data communications events in a PAMI according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and from in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations in a parallel computer that processes data communications events according to embodiments of the present invention may contain only a few compute nodes or may contain thousands of compute nodes. For ease of explanation, the data communications network of FIG. 4 is illustrated with only three dimensions: x, y, and z, but readers will recognize that a data communications network optimized for point-to-point operations may in fact be implemented in two dimensions, four dimensions, five dimensions, and so on. As mentioned, several supercomputers now use five dimensional mesh or torus networks, including IBM's Blue Gene Q™.

Figure 5:
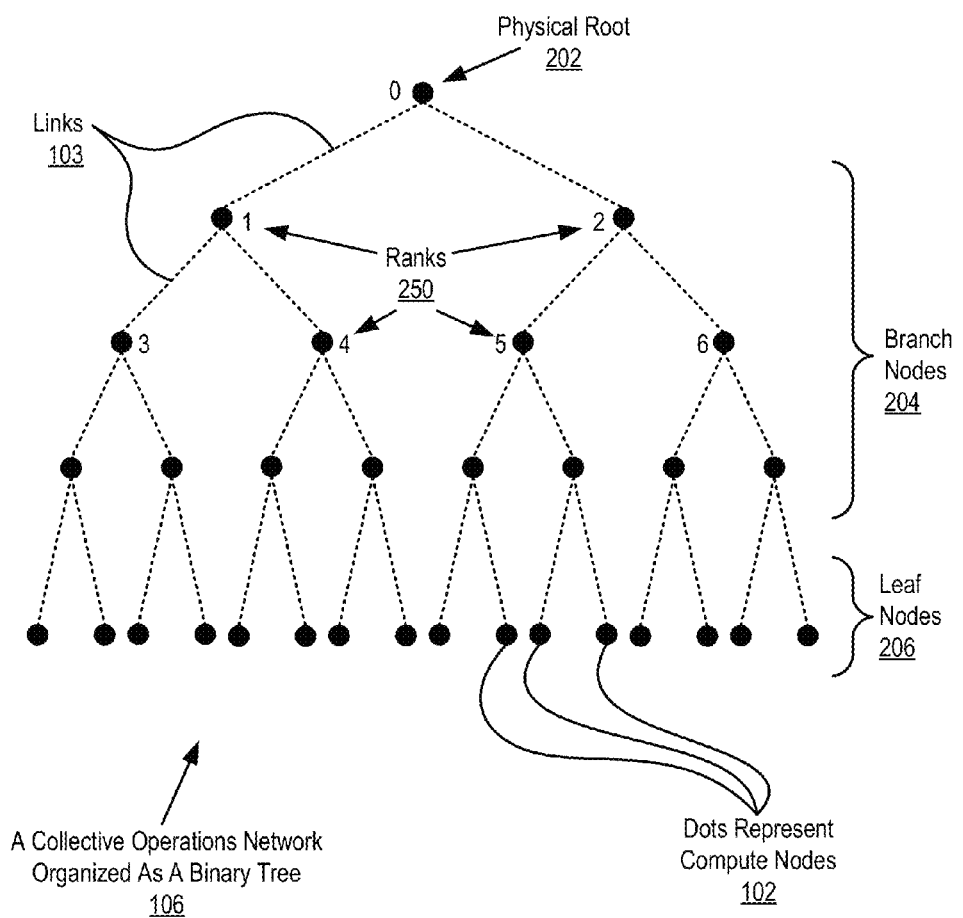
FIG. 5 illustrates an example data communications network optimized for collective operations by organizing compute nodes in a tree for use in parallel computers that process data communications events in a PAMI according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that process data communications events in a PAMI according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. A compute node can, however, support multiple processors, each of which can support multiple processing cores—so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
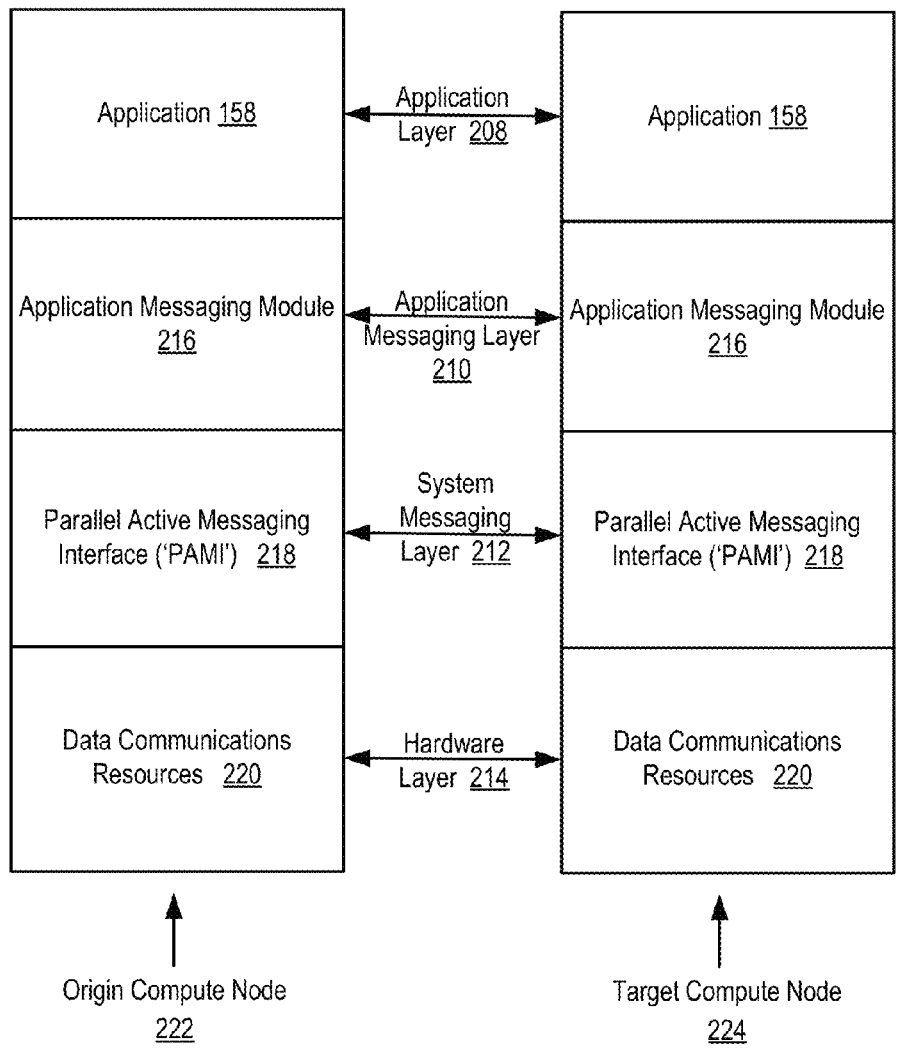
FIG. 6 sets forth a block diagram of an example protocol stack for use in parallel computers that process data communications events in a PAMI according to embodiments of the present invention.

For further explanation, FIG. 6 sets forth a block diagram of an example protocol stack useful in parallel computers that process data communications events in a PAMI according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224), although it is worthwhile to point out that in embodiments that effect DMA data transfers, the origin compute node and the target compute node can be the same compute node. The granularity of connection through the system messaging layer (212), which is implemented with a PAMI (218), is finer than merely compute node to compute node—because, again, communications among endpoints often is communications among endpoints on the same compute node. For further explanation, recall that the PAMI (218) connects endpoints, connections specified by combinations of clients, contexts, and tasks, each such combination being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact, and often will, be the same compute node.

The application layer (208) provides communications among instances of a parallel application (158) running on the compute nodes (222, 224) by invoking functions in an application messaging module (216) installed on each compute node. Communications among instances of the application through messages passed between the instances of the application. Applications may communicate messages invoking function of an application programming interface ('API') exposed by the application messaging module (216). In this approach, the application messaging module (216) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (602) and the application messaging layer (610). Such system-level functions are typically invoked through an API exposed to the application messaging modules (216) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use the PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (222) on the physical network medium. In parallel computers that process data communications events with DMA controllers according to embodiments of the present invention, the hardware layer includes DMA controllers and network links, including routers, packet switches, and the like.

Figure 7:
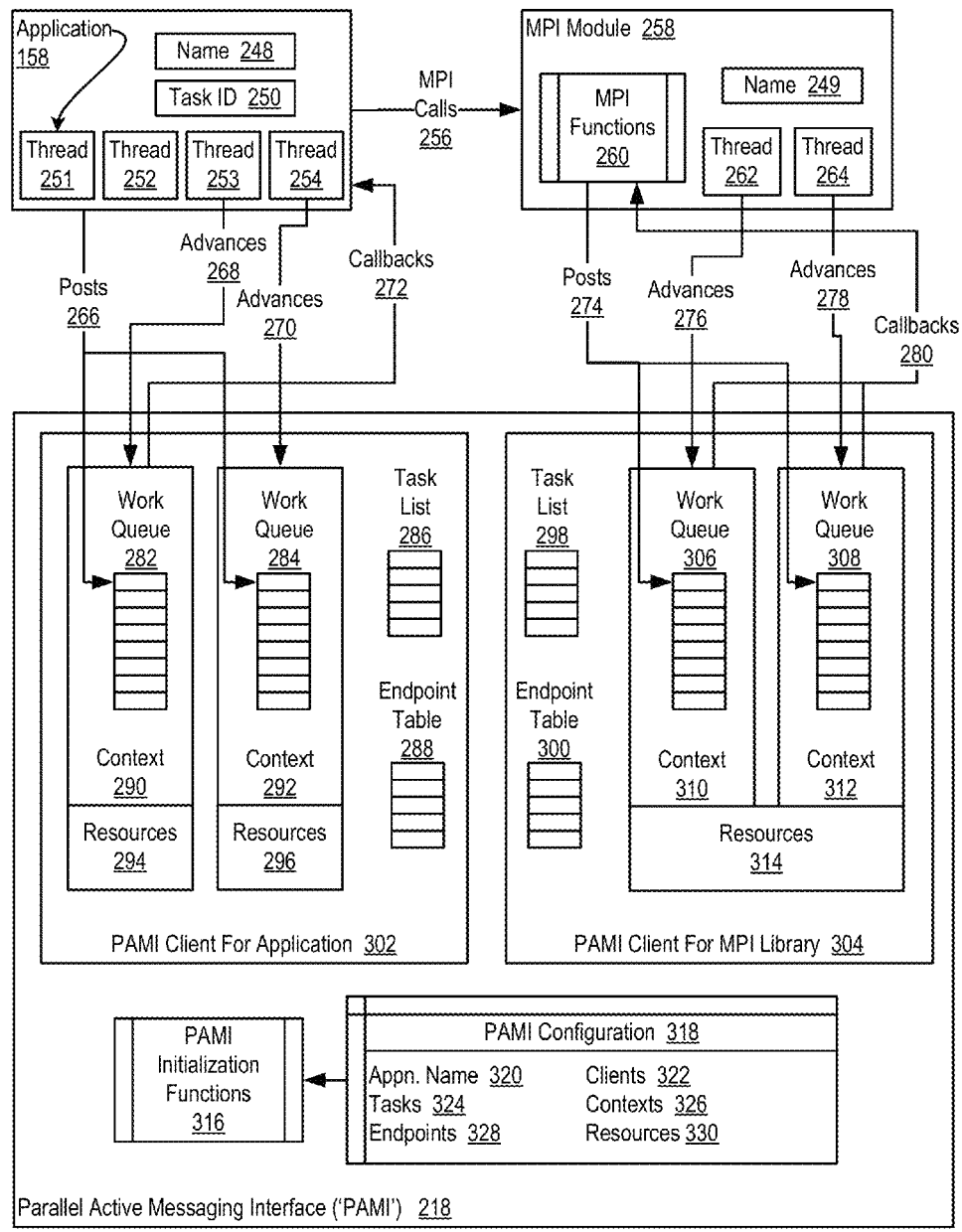
FIG. 7 sets forth a functional block diagram of an example PAMI for use in parallel computers that process data communications events in a PAMI according to embodiments of the present invention.

For further explanation, FIG. 7 sets forth a functional block diagram of an example PAMI (218) for use in parallel computers that process data communications events in a PAMI according to embodiments of the present invention. The PAMI (218) provides an active messaging layer that supports both point to point communications in a mesh or torus as well as collective operations, gathers, reductions, barriers, and the like in tree networks, for example. The PAMI is a multi-threaded parallel communications engine designed to provide low level message passing functions, many of which are one-sided, and abstract such functions for higher level messaging middleware, referred to in this specification as 'application messaging modules' in an application messaging layer. In the example of FIG. 7, the application messaging layer is represented by a generic MPI module (258), appropriate for ease of explanation because some form of MPI is a de facto standard for such messaging middleware. Compute nodes and communications endpoints of a parallel computer (102 on FIG. 1) are coupled for data communications through such a PAMI and through data communications resources (294, 296, 314) that include DMA controllers, network adapters, and data communications networks through which controllers and adapters deliver data communications. The PAMI (218) provides data communications among data communications endpoints, where each endpoint is specified by data communications parameters for a thread of execution on a compute node, including specifications of a client, a context, and a task.

The PAMI (218) in this example includes PAMI clients (302, 304), tasks (286, 298), contexts (190, 292, 310, 312), and endpoints (288, 300). A PAMI client is a collection of data communications resources (294, 295, 314) dedicated to the exclusive use of an application-level data processing entity, an application or an application messaging module such as an MPI library. Data communications resources assigned in collections to PAMI clients are explained in more detail below with reference to FIGS. 8A and 8B. PAMI clients (203, 304 on FIG. 7) enable higher level middleware, application messaging modules, MPI libraries, and the like, to be developed independently so that each can be used concurrently by an application. Although the application messaging layer in FIG. 7 is represented for example by a single generic MPI module (258), in fact, a PAMI, operating multiple clients, can support multiple message passing libraries or application messaging modules simultaneously, a fact that is explained in more detail with reference to FIG. 9. FIG. 9 sets forth a functional block diagram of an example PAMI (218) useful in parallel computers that process data communications events in a PAMI according to embodiments of the present invention in which the example PAMI operates, on behalf of an application (158), with multiple application messaging modules (502-510) simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 9, each client (532-540) includes a collection of data communications resources (522-530) dedicated to the exclusive use of an application-level data processing entity, one of the application messaging modules (502-510):

IBM MPI Library (502) operates through context (512) data communications resources (522) dedicated to the use of PAMI client (532), MPICH Library (504) operates through context (514) data communications resources (524) dedicated to the use of PAMI client (534), Unified Parallel C ('UPC') Library (506) operates through context (516) data communications resources (526) dedicated to the use of PAMI client (536), Partitioned Global Access Space ('PGAS') Runtime Library (508) operates through context (518) data communications resources (528) dedicated to the use of PAMI client (538), and Aggregate Remote Memory Copy Interface ('ARMCI') Library (510) operates through context (520) data communications resources (530) dedicated to the use of PAMI client (540).

Again referring to the example of FIG. 7: The PAMI (218) includes tasks, listed in task lists (286, 298) and identified (250) to the application (158). A 'task' as the term is used in PAMI operations is a platform-defined integer datatype that identifies a canonical application process, an instance of a parallel application (158). Very carefully in this specification, the term 'task' is always used to refer only to this PAMI structure, not the traditional use of the computer term 'task' to refer to a process or thread of execution. In this specification, the term 'process' refers to a canonical data processing process, a container for threads in a multithreading environment. In particular in the example of FIG. 7, the application (158) is implemented as a canonical process with multiple threads (251-254) assigned various duties by a leading thread (251) which itself executes an instance of a parallel application program. Each instance of a parallel application is assigned a task; each task so assigned can be an integer value, for example, in a C environment, or a separate task object in a C++ or Java environment. The tasks are components of communications endpoints, but are not themselves communications endpoints; tasks are not addressed directly for data communications in PAMI. This gives a finer grained control than was available in prior message passing art. Each client has its own list (286, 298) of tasks for which its contexts provide services; this allows each process to potentially reside simultaneously in two or more different communications domains as will be the case in certain advanced computers using, for example, one type of processor and network in one domain and a completely different processor type and network in another domain, all in the same computer.

The PAMI (218) includes contexts (290, 292, 310, 312). A 'context' as the term is used in PAMI operations is composed of a subset of a client's collection of data processing resources, context functions, and a work queue of data transfer instructions to be performed by use of the subset through the context functions operated by an assigned thread of execution. That is, a context represents a partition of the local data communications resources assigned to a PAMI client. Every context within a client has equivalent functionality and semantics. Context functions implement contexts as threading points that applications use to optimize concurrent communications. Communications initiated by a local process, an instance of a parallel application, uses a context object to identify the specific threading point that will be used to issue a particular communication independent of communications occurring in other contexts. In the example of FIG. 7, where the application (158) and the application messaging module (258) are both implemented as canonical processes with multiple threads of execution, each has assigned or mapped particular threads (253, 254, 262, 264) to advance (268, 270, 276, 278) work on the contexts (290, 292, 310, 312), including execution of local callbacks (272, 280). In particular, the local event callback functions (272, 280) associated with any particular communication are invoked by the thread advancing the context that was used to initiate the communication operation in the first place. Like PAMI tasks, contexts are not used to directly address a communication destination or target, as they are a local resource.

Context functions, explained here with regard to references (472-482) on FIG. 9, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications using such non-reentrant functions must somehow ensure that critical sections are protected from re-entrant use. Applications can use mutual exclusion locks to protect critical sections. The lock (476) and unlock (478) functions in the example of FIG. 9 provide and operate such a mutual exclusion lock to protect the critical sections in the post (480) and advance (482) functions. If only a single thread posts or advances work on a context, then that thread need never lock that context. To the extent that progress is driven independently on a context by a single thread of execution, then no mutual exclusion locking of the context itself is required—provided that no other thread ever attempts to call a function on such a context. If more than one thread will post or advance work on a context, each such thread must secure a lock before calling a post or an advance function on that context. This is one reason why it is probably a preferred architecture, given sufficient resources, to assign one thread to operate each context. Progress can be driven with advance (482) functions concurrently among multiple contexts by using multiple threads, as desired by an application—shown in the example of FIG. 7 by threads (253, 254, 262, 264) which advance work concurrently, independently and in parallel, on contexts (290, 292, 310, 312).

Posts and advances (480, 482 on FIG. 9) are functions called on a context, either in a C-type function with a context ID as a parameter, or in object oriented practice where the calling entity possesses a reference to a context or a context object as such and the posts and advances are member methods of a context object. Again referring to FIG. 7: Application-level entities, application programs (158) and application messaging modules (258), post (266, 274) data communications instructions, including SENDs, RECEIVEs, PUTs, GETs, and so on, to the work queues (282, 284, 306, 308) in contexts and then call advance functions (268, 270, 276, 278) on the contexts to progress specific data processing and data communications that carry out the instructions. The data processing and data communications effected by the advance functions include specific messages, request to send ('RTS') messages, acknowledgments, callback execution, transfers of transfer data or payload data, and so on. Advance functions therefore operate generally by checking a work queue for any new instructions that need to be initiated and checking data communications resources for any incoming message traffic that needs to be administered as well as increases in storage space available for outgoing message traffic, with callbacks and the like. Advance functions also carry out or trigger transfers of transfer data or payload data.

In at least some embodiments, a context's subset of a client's data processing resources is dedicated to the exclusive use of the context. In the example of FIG. 7, context (290) has a subset (294) of a client's (302) data processing resources dedicated to the exclusive use of the context (290), and context (292) has a subset (296) of a client's (302) data processing resources dedicated to the exclusive use of the context (292). Advance functions (268, 270) called on contexts (290, 292) therefore never need to secure a lock on a data communications resource before progressing work on a context—because each context (290, 292) has exclusive use of dedicated data communications resources. Usage of data communications resources in this example PAMI (218), however, is not thread-safe. When data communications resources are shared among contexts, mutual exclusion locks are needed. In contrast to the exclusive usage of resources by contexts (290, 292), contexts (310, 312) share access to their client's data communications resource (314) and therefore do not have data communications resources dedicated to exclusive use of a single context. Contexts (310, 312) therefore always must secure a mutual exclusion lock on a data communications resource before using the resource to send or receive administrative messages or transfer data.

For further explanation, here is an example pseudocode Hello World program for an application using a PAMI:

```
int main(int argc, char ** argv)
{
    PAMI_client_t client;
    PAMI_context_t context;
    PAMI_result_t status = PAMI_ERROR;
    const char  *name = "PAMI";
    status  = PAMI_Client_initialize(name, &client);
    size_t _n = 1;
    status  = PAMI_Context_createv(client, NULL, 0, &context, _n);
    PAMI_configuration_t configuration;
    configuration.name = PAMI_TASK_ID;
    status = PAMI_Configuration_query(client, &configuration);
    size_t task_id = configuration.value.intval;
    configuration.name = PAMI_NUM_TASKS;
    status = PAMI_Configuration_query(client, &configuration);
    size_t num_tasks = configuration.value.intval;
    fprintf (stderr, "Hello process %d of %d\n", task_id, num_tasks);
    status = PAMI_Context_destroy(context);
    status = PAMI_Client_finalize(client);
    return 0;
}
```

This short program is termed 'pseudocode' because it is an explanation in the form of computer code, not a working model, not an actual program for execution. In this pseudocode example, an application initializes a client and a context for an application named "PAMI." PAMI_Client_initialize and PAMI_Context_createv are initialization functions (316) exposed to applications as part of a PAMI's API. These functions, in dependence upon the application name "PAMI," pull from a PAMI configuration (318) the information needed to establish a client and a context for the application. The application uses this segment:

```
PAMI_configuration_t configuration;
configuration.name = PAMI_TASK_ID;
status = PAMI_Configuration_query(client, &configuration);
size_t task_id = configuration.value.intval;
``` to retrieve its task ID and this segment:

```
configuration.name = PAMI_NUM_TASKS;
status = PAMI_Configuration_query(client, &configuration);
size_t num_tasks = configuration.value.intval;
``` to retrieve the number of tasks presently configured to carry out parallel communications and process data communications event in the PAMI. The applications prints "Hello process task_id of num_tasks," where task_id is the task ID of the subject instance of a parallel application, and num_tasks is the number of instances of the application executing in parallel on compute nodes. Finally, the application destroys the context and terminates the client.

Figure 8A:
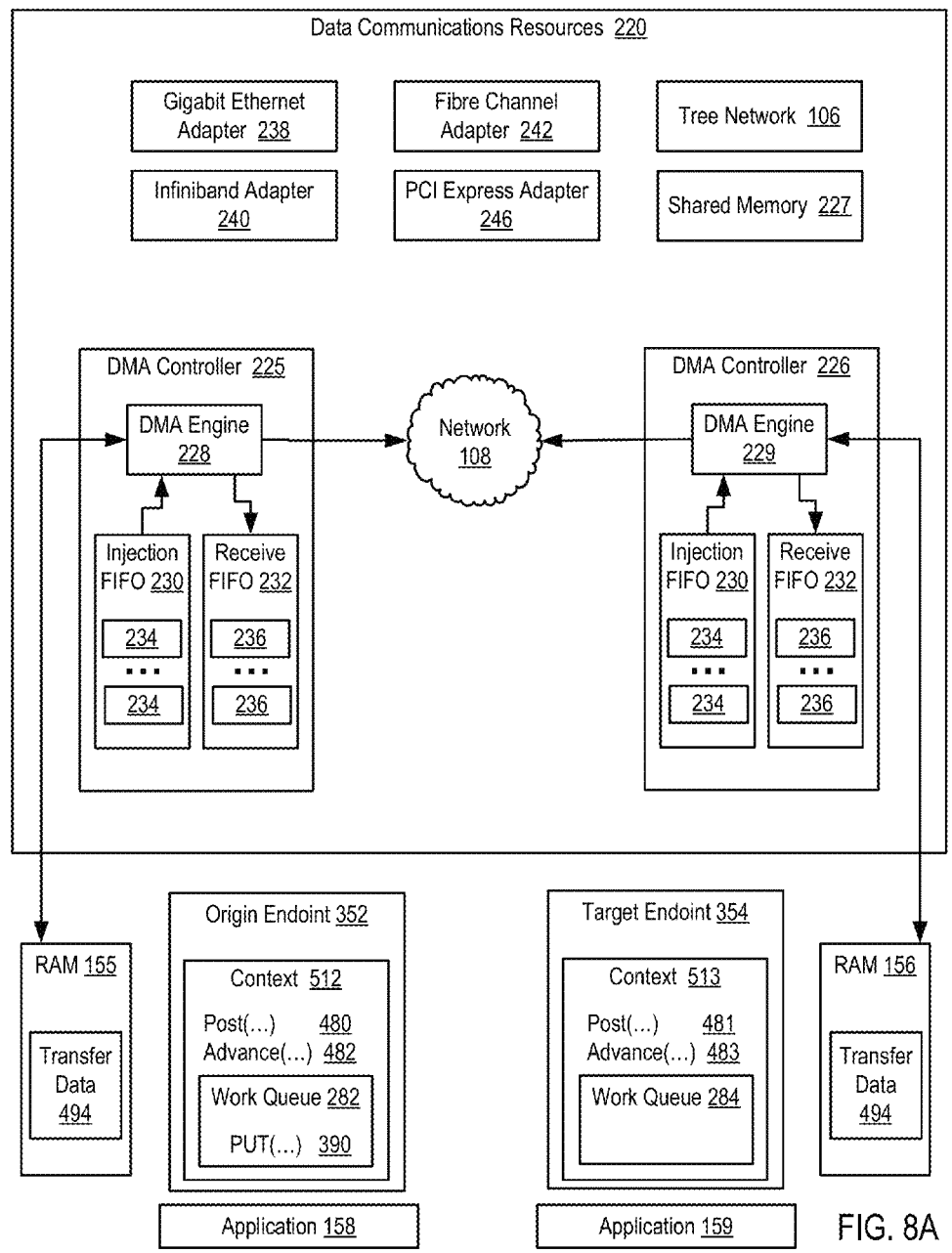
FIG. 8A sets forth a functional block diagram of example data communications resources for use in parallel computers that process data communications events in a PAMI according to embodiments of the present invention.
Figure 9:
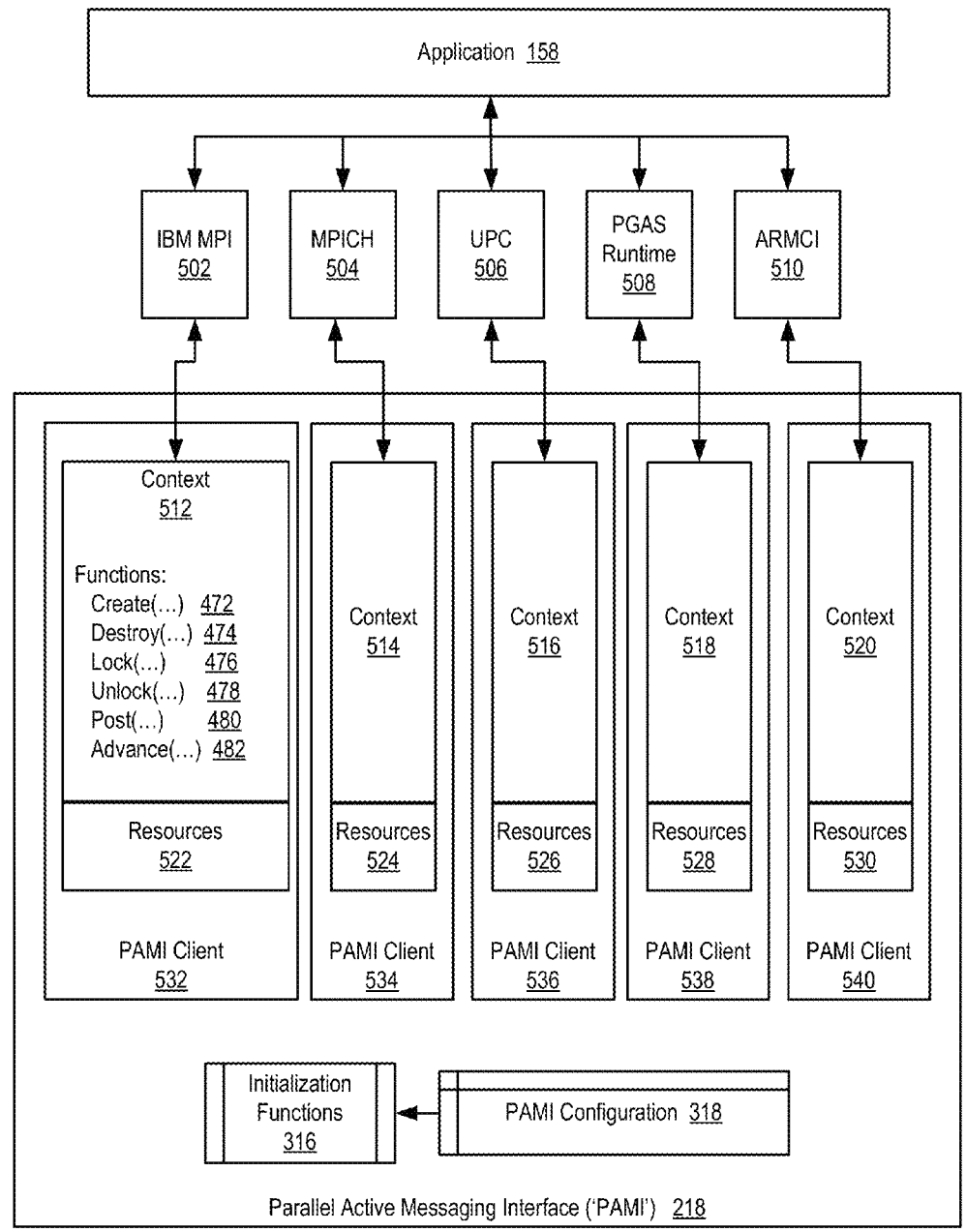
FIG. 9 sets forth a functional block diagram of an example PAMI for use in parallel computers that process data communications events in a PAMI according to embodiments of the present invention.

For further explanation of data communications resources assigned in collections to PAMI clients, FIG. 8A sets forth a block diagram of example data communications resources (220) useful in parallel computers that process data communications events in a PAMI according to embodiments of the present invention. The data communications resources of FIG. 8A include a gigabit Ethernet adapter (238), an Infiniband adapter (240), a Fibre Channel adapter (242), a PCI Express adapter (246), a collective operations network configured as a tree (106), shared memory (227), DMA controllers (225, 226), and a network (108) configured as a point-to-point torus or mesh like the network described above with reference to FIG. 4. A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six segments (227) of shared memory, six Gigabit Ethernet adapters (238), and six Infiniband adapters (240). And the PAMI client (304) can have dedicated to its use six Fibre Channel adapters (242), a DMA controller (225), a torus network (108), and five segments (227) of shared memory. And so on.

The DMA controllers (225, 226) each are configured with DMA control logic in the form of a DMA engine (228, 229), an injection FIFO buffer (230), and a receive FIFO buffer (232). The DMA engines (228, 229) can be implemented as a hardware components, logic networks of a DMA controller, in firmware, as software operating an embedded controller, as various combinations of software, firmware, or hardware, and so on. Each DMA engine (228, 229) operates on behalf of endpoints to send and receive DMA transfer data through the network (108). In addition, the DMA engines represent specific examples of the more general-purpose buffer managers (372 on FIGS. 12, 13) described below in this specification. The injection FIFO buffers (230) are specific examples of send buffers (230 on FIGS. 1, 12, 13), and the receive FIFO buffers (232) are specific examples of receive buffers (232 on FIGS. 1, 12, 13).

For further explanation, here is an example use case, a description of the overall operation of a PUT DMA transfer, for example, with the DMA controllers (225, 226) and network (108) in the example of FIG. 8A: An originating application (158), which is typically one instance of a parallel application running on a compute node, places a quantity of transfer data (494) at a location in its RAM (155). The application (158) then calls a post function (480) on a context (512) of an origin endpoint (352), posting a PUT instruction (390) into a work queue (282) of the context (512); the PUT instruction (390) specifies a target endpoint (354) to which the transfer data is to be sent as well as source and destination memory locations. The application then calls an advance function (482) on the context (512). The advance function (482) finds the new PUT instruction in its work queue (282) and inserts a data descriptor (234) into the injection FIFO of the origin DMA controller (225); the data descriptor includes the source and destination memory locations and the specification of the target endpoint. The origin DMA engine (225) then transfers the data descriptor (234) as well as the transfer data (494) through the network (108) to the DMA controller (226) on the target side of the transaction. The target DMA engine (229), upon receiving the data descriptor and the transfer data, places the transfer data (494) into the RAM (156) of the target application at the location specified in the data descriptor and inserts into the target DMA controller's receive FIFO (232) a data descriptor (236) that specifies the target endpoint and the location of the transfer data (494) in RAM (156). The target application (159) or application instance calls an advance function (483) on a context (513) of the target endpoint (354). The advance function (483) checks the communications resources assigned to its context (513) for incoming messages, including checking the receive FIFO (232) of the target DMA controller (226) for data descriptors that specify the target endpoint (354). The advance function (483) finds the data descriptor for the PUT transfer and advises the target application (159) that its transfer data has arrived. A GET-type DMA transfer works in a similar manner, with some differences described in more detail below, including, of course, the fact that transfer data flows in the opposite direction. Similarly, typical SEND transfers also operate similarly, some with rendezvous protocols, some with eager protocols, with data transmitted in packets over the a network through non-DMA network adapters rather than DMA controllers.

Figure 8B:
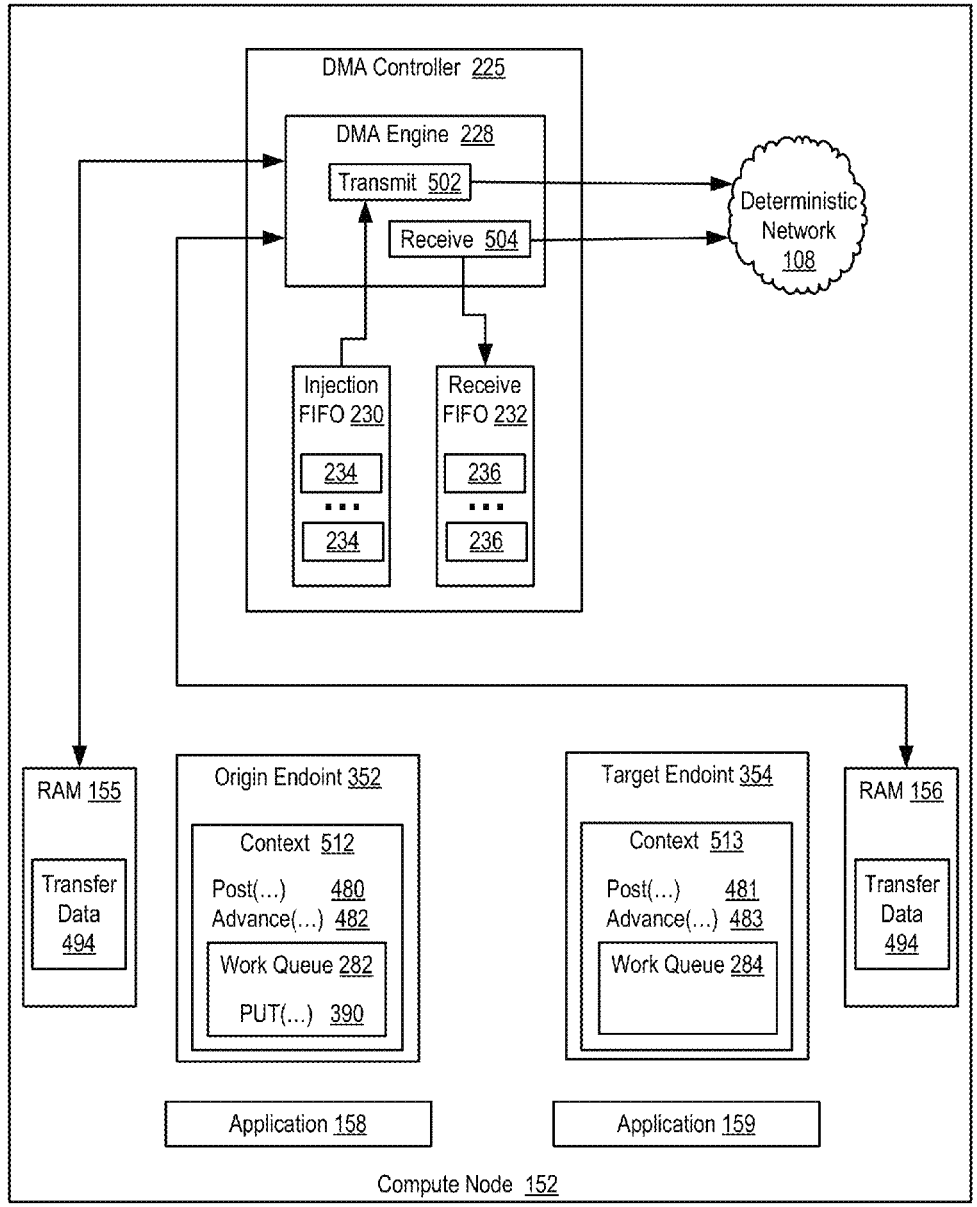
FIG. 8B sets forth a functional block diagram of an example DMA controller operatively coupled to a segment of shared memory—in an architecture where the DMA controller is the only DMA controller on a compute node—and an origin endpoint and its target endpoint are both located on the same compute node.

The example of FIG. 8A includes two DMA controllers (225, 226). DMA transfers between endpoints on separate compute nodes use two DMA controllers, one on each compute node. Compute nodes can be implemented with multiple DMA controllers so that many or even all DMA transfers even among endpoints on a same compute node can be carried out using two DMA engines. In some embodiments at least, however, a compute node, like the example compute node (152) of FIG. 2, has only one DMA engine, so that that DMA engine can be use to conduct both sides of transfers between endpoints on that compute node. For further explanation of this fact, FIG. 8B sets forth a functional block diagram of an example DMA controller (225) operatively coupled to a network (108)—in an architecture where this DMA controller (225) is the only DMA controller on a compute node—and an origin endpoint (352) and its target endpoint (354) are both located on the same compute node (152). In the example of FIG. 8B, a single DMA engine (228) operates with two threads of execution (502, 504) on behalf of endpoints (352, 354) on a same compute node to send and receive DMA transfer data through a segment (227) of shared memory. A transmit thread (502) injects transfer data into the network (108) as specified in data descriptors (234) in an injection FIFO buffer (230), and a receive thread (502) receives transfer data from the network (108) as specified in data descriptors (236) in a receive FIFO buffer (232).

The overall operation of an example PUT DMA transfer with the DMA controllers (225) and the network (108) in the example of FIG. 8B is: An originating application (158), that is actually one of multiple instances (158, 159) of a parallel application running on a compute node (152) in separate threads of execution, places a quantity of transfer data (494) at a location in its RAM (155). The application (158) then calls a post function (480) on a context (512) of an origin endpoint (352), posting a PUT instruction (390) into a work queue (282) of the context (512); the PUT instruction specifies a target endpoint (354) to which the transfer data is to be sent as well as source and destination memory locations. The application (158) then calls an advance function (482) on the context (512). The advance function (482) finds the new PUT instruction (390) in its work queue (282) and inserts a data descriptor (234) into the injection FIFO of the DMA controller (225); the data descriptor includes the source and destination memory locations and the specification of the target endpoint. The DMA engine (225) then transfers by its transmit and receive threads (502, 504) through the network (108) the data descriptor (234) as well as the transfer data (494). The DMA engine (228), upon receiving by its receive thread (504) the data descriptor and the transfer data, places the transfer data (494) into the RAM (156) of the target application and inserts into the DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the DMA controller (225) for data descriptors that specify the target endpoint (354). The advance function (483) finds the data descriptor for the PUT transfer and advises the target application (159) that its transfer data has arrived. Again, a GET-type DMA transfer works in a similar manner, with some differences described in more detail below, including, of course, the fact that transfer data flows in the opposite direction. And typical SEND transfers also operate similarly, some with rendezvous protocols, some with eager protocols, with data transmitted in packets over the a network through non-DMA network adapters rather than DMA controllers.

By use of an architecture like that illustrated and described with reference to FIG. 8B, a parallel application or an application messaging module that is already programmed to use DMA transfers can gain the benefit of the speed of DMA data transfers among endpoints on the same compute node with no need to reprogram the applications or the application messaging modules to use the network in other modes. In this way, an application or an application messaging module, already programmed for DMA, can use the same DMA calls through a same API for DMA regardless whether subject endpoints are on the same compute node or on separate compute nodes.

Figure 10:
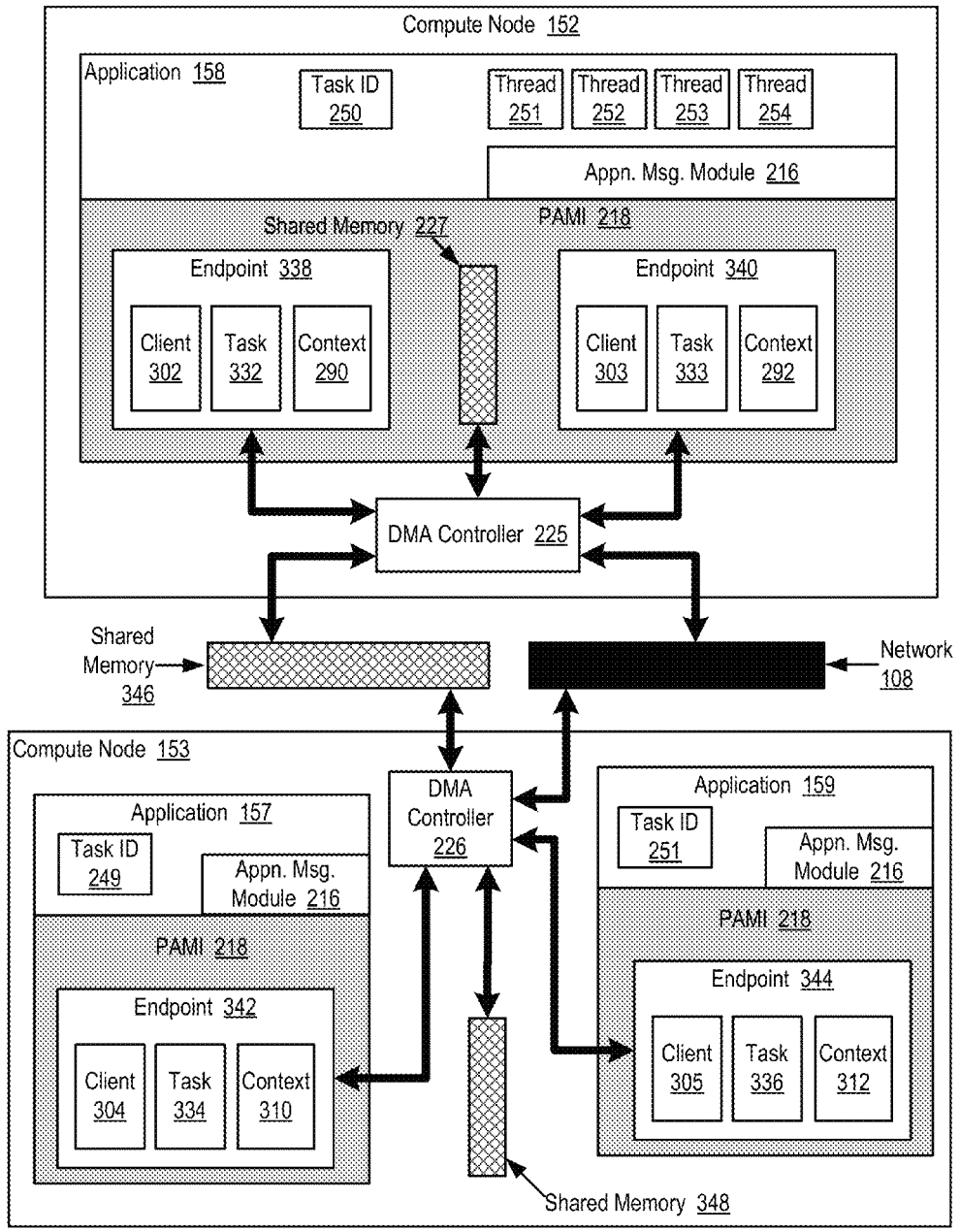
FIG. 10 sets forth a functional block diagram of example endpoints for use in parallel computers that process data communications events in a PAMI according to embodiments of the present invention.

For further explanation, FIG. 10 sets forth a functional block diagram of example endpoints useful in parallel computers that process data communications events in a PAMI according to embodiments of the present invention. In the example of FIG. 10, a PAMI (218) is implemented with instances on two separate compute nodes (152, 153) that include four endpoints (338, 340, 342, 344). These endpoints are opaque objects used to address an origin or destination in a process and are constructed from a (client, task, context) tuple. Non-DMA SEND instructions as well as DMA instructions such as PUT and GET address a destination by use of an endpoint object or endpoint identifier.

Each endpoint (338, 340, 342, 344) in the example of FIG. 10 is composed of a client (302, 303, 304, 305), a task (332, 333, 334, 335), and a context (290, 292, 310, 312). Using a client a component in the specification of an endpoint disambiguates the task and context identifiers, as these identifiers may be the same for multiple clients. A task is used as a component in the specification of an endpoint to construct an endpoint to address a process accessible through a context. A context in the specification of an endpoint identifies, refers to, or represents the specific context associated with a the destination or target task—because the context identifies a specific threading point on a task. A context offset identifies which threading point is to process a particular communications operation. Endpoints enable "crosstalk" which is the act of issuing communication on a local context with a particular context offset that is directed to a destination endpoint with no correspondence to a source context or source context offset.

For efficient utilization of storage in an environment where multiple tasks of a client reside on the same physical compute node, an application may choose to write an endpoint table (288, 300 on FIG. 7) in a segment of shared memory (227, 346, 348). It is the responsibility of the application to allocate such segments of shared memory and coordinate the initialization and access of any data structures shared between processes. This includes any endpoint objects which are created by one process or instance of an application and read by another process.

Endpoints (342, 344) on compute node (153) serve respectively two application instances (157, 159). The tasks (334, 336) in endpoints (342, 344) are different. The task (334) in endpoint (342) is identified by the task ID (249) of application (157), and the task (336) in endpoint (344) is identified by the task ID (251) of application (159). The clients (304, 305) in endpoints (342, 344) are different, separate clients. Client (304) in endpoint (342) associates data communications resources (e.g., 294, 296, 314 on FIG. 7) dedicated exclusively to the use of application (157), while client (305) in endpoint (344) associates data communications resources dedicated exclusively to the use of application (159). Contexts (310, 312) in endpoints (342, 344) are different, separate contexts. Context (310) in endpoint (342) operates on behalf of application (157) a subset of the data communications resources of client (304), and context (312) in endpoint (344) operates on behalf of application (159) a subset of the data communications resources of client (305).

Contrasted with the PAMIs (218) on compute node (153), the PAMI (218) on compute node (152) serves only one instance of a parallel application (158) with two endpoints (338, 340). The tasks (332, 333) in endpoints (338, 340) are the same, because they both represent a same instance of a same application (158); both tasks (332,333) therefore are identified, either with a same variable value, references to a same object, or the like, by the task ID (250) of application (158). The clients (302, 303) in endpoints (338, 340) are optionally either different, separate clients or the same client. If they are different, each associates a separate collection of data communications resources. If they are the same, then each client (302, 303) in the PAMI (218) on compute node (152) associates a same set of data communications resources and is identified with a same value, object reference, or the like. Contexts (290, 292) in endpoints (338, 340) are different, separate contexts. Context (290) in endpoint (338) operates on behalf of application (158) a subset of the data communications resources of client (302) regardless whether clients (302, 303) are the same client or different clients, and context (292) in endpoint (340) operates on behalf of application (158) a subset of the data communications resources of client (303) regardless whether clients (302, 303) are the same client or different clients. Thus the tasks (332, 333) are the same; the clients (302, 303) can be the same; and the endpoints (338, 340) are distinguished at least by different contexts (290, 292), each of which operates on behalf of one of the threads (251-254) of application (158), identified typically by a context offset or a threading point.

Endpoints (338, 340) being as they are on the same compute node (152) can effect DMA data transfers between endpoints (338, 340) through DMA controller (225) and a segment of shared local memory (227). In the absence of such shared memory (227), endpoints (338, 340) can effect DMA data transfers through the DMA controller (225) and the network (108), even though both endpoints (338, 340) are on the same compute node (152). DMA transfers between endpoint (340) on compute node (152) and endpoint (344) on another compute node (153) go through DMA controllers (225, 226) and either a network (108) or a segment of shared remote memory (346). DMA transfers between endpoint (338) on compute node (152) and endpoint (342) on another compute node (153) also go through DMA controllers (225, 226) and either a network (108) or a segment of shared remote memory (346). The segment of shared remote memory (346) is a component of a Non-Uniform Memory Access ('NUMA') architecture, a segment in a memory module installed anywhere in the architecture of a parallel computer except on a local compute node. The segment of shared remote memory (346) is 'remote' in the sense that it is not installed on a local compute node. A local compute node is 'local' to the endpoints located on that particular compute node. The segment of shared remote memory (346), therefore, is 'remote' with respect to endpoints (338, 340) on compute node (158) if it is in a memory module on compute node (153) or anywhere else in the same parallel computer except on compute node (158).

Endpoints (342, 344) being as they are on the same compute node (153) can effect DMA data transfers between endpoints (342, 344) through DMA controller (226) and a segment of shared local memory (348). In the absence of such shared memory (348), endpoints (342, 344) can effect DMA data transfers through the DMA controller (226) and the network (108), even though both endpoints (342, 344) are on the same compute node (153). DMA transfers between endpoint (344) on compute node (153) and endpoint (340) on another compute node (152) go through DMA controllers (226, 225) and either a network (108) or a segment of shared remote memory (346). DMA transfers between endpoint (342) on compute node (153) and endpoint (338) on another compute node (158) go through DMA controllers (226, 225) and either a network (108) or a segment of shared remote memory (346). Again, the segment of shared remote memory (346) is 'remote' with respect to endpoints (342, 344) on compute node (153) if it is in a memory module on compute node (158) or anywhere else in the same parallel computer except on compute node (153).

Figure 11:
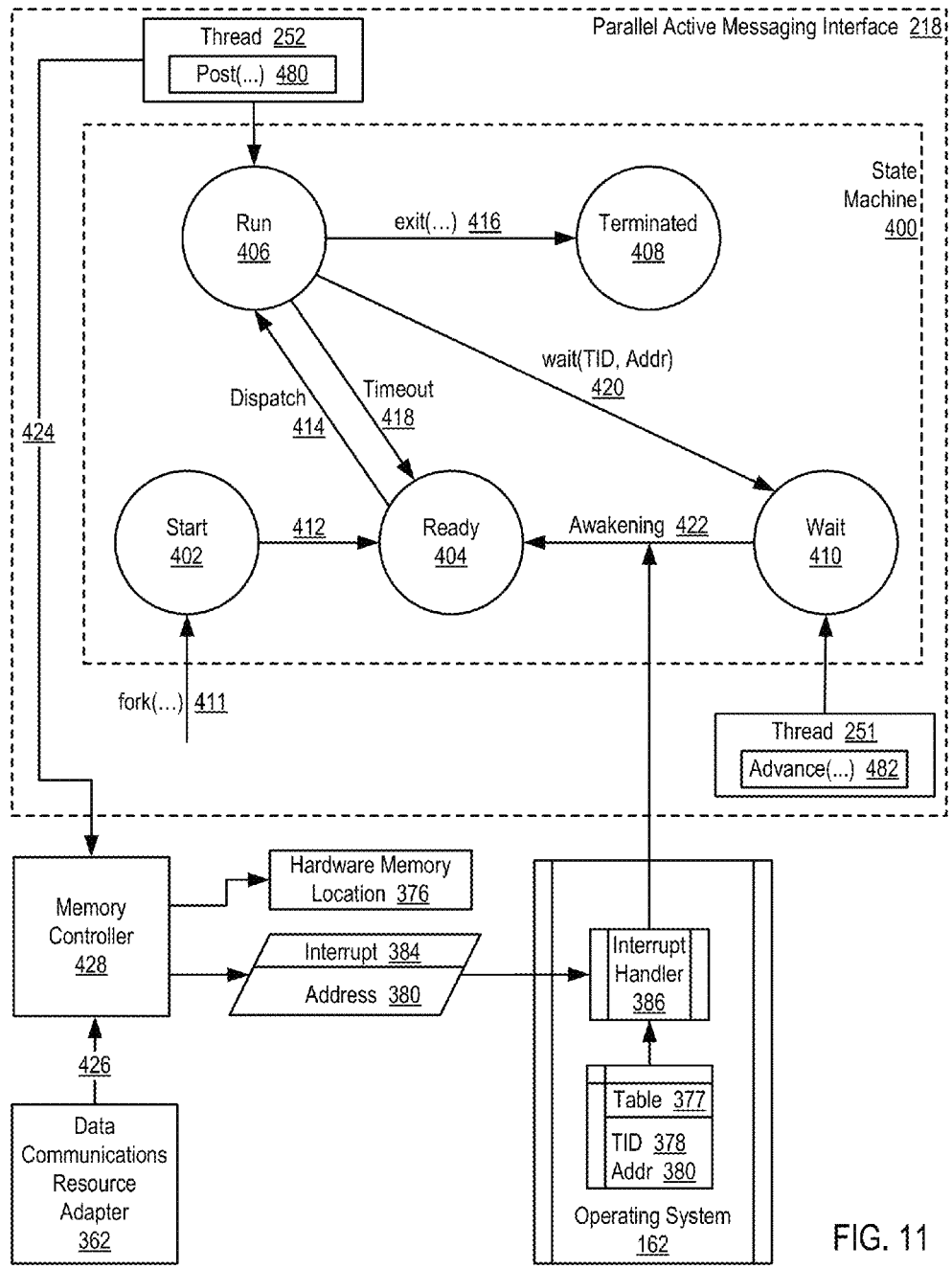
FIG. 11 illustrated an example state machine for thread execution in a processor of a parallel computer that processes data communications events in a PAMI according to embodiments of the present invention.

For further explanation, FIG. 11 illustrates an example state machine (400) for thread execution in a processor of a parallel computer that processes data communications events in a PAMI according to embodiments of the present invention. The example state machine (400) includes five states: a Start state (402), a Reach state (404), a Run state (406), a Terminated state (408), and a Wait state (410). A thread is forked (411) from another thread into the Start state (402), where an operating system (162) assigns a thread identifier ('TID'), constructs a descriptor for the thread, conducts other housekeeping to set up the thread for execution, and advances (412) the thread to the Ready state (404). From the Run state (404) the thread is dispatched (414) according to priorities and dispatch policies into the Run state (406) where the thread has actual possession of a processor for execution of the thread. From the Run state (406), the thread can exit (416) to termination (408), time out of a quant (418) and return to the Ready state (404) to await eventual dispatch (414) again to the Run state (405), or call an interrupt and transition to the Wait state (410). After interrupt processing, the thread can be awakened (422) from the Wait state (410) and returned to the Ready state (404) for eventual dispatch (414) back onto a processor.

The example of FIG. 11 is illustrated with an advance function (482) executing in a thread (251) in the Wait state (410) and a post function (480) executing in a thread (252) that is presently in possession of a processor in the Run state (406). Both the post function (480) and the advance function (482) are entities of a PAMI, not shown here, like the PAMIs described and illustrated above in this specification, composed of data communications endpoints that specify data communications parameters for threads of execution, specifications of clients, contexts, tasks, and so on.

The advance function's thread (251) is in the Wait state (410) because the advance function (482) previously examined the data communication resources assigned to its context and determined that there were no actionable data communications events pending for the context. The advance function (482) then placed the thread (251) into the Wait state (410) by a call to wait (TID, Addr) (420) to wait for a subsequent data communications event for its context. Although this specification describes a Wait state and speaks of awakening from the Wait state, readers will recognize that this Wait state is neither a traditional Unix-style sleep state in which a thread sleeps for an uninterruptable period of time defined in a sleep(time) function, nor is this Wait state a traditional Unix-style wait state in which a parent thread waits for a child thread to complete execution. Although this specification describes a wait(TID, Addr) function and speaks of awakening from a Wait state, readers will recognize that this wait (TID, Addr) is neither a traditional Unix-style sleep(time) function which causes a thread to sleep for an uninterruptable period of time defined in the sleep(time) call, nor is this wait(TID, Addr) a traditional Unix-style wait( ) function which causes a parent thread to wait for a child thread to complete execution.

In this wait(TID, Addr) function, the TID parameter is a thread identifier, and the Addr parameter is the address of an accessed hardware memory location (376). The wait( ) function is an operating system call that the operating system (162) processes by moving a thread (251) from the Run state (406) to the Wait state (410) and storing in a record of Table (377) an identifier for the thread (378) in association with the memory address (380) of the accessed hardware memory location (376). This example illustrates only one hardware memory location (376) whose access triggers interrupts (384), but readers will recognize that large computers with many processors and many threads of execution will support many hardware memory locations whose access triggers interrupts to a Wait state because there will be many advance functions running in many threads of execution.

When a subsequent data communications event for the context eventually occurs, the thread (251) awakens (422) from the Wait state (410), transitions to the Ready state (404) from which it is eventually again dispatched for execution into the Run state (406). When the thread (251) running the advance function (482) again gains possession of a processor, the advance function processes any subsequent data communications events then pending for its context. In an embodiment, the advance function re-enters the Wait state after processing all subsequent data communications events pending for its context. In this way, a calling application can advance work on a context with only one call to an advance function on the context and know that all work on the context will be advanced, in effect a fire-and-forget advance, instead of any requirement to continually call the advance function to advance work on a context.

Incoming data communications events that can awaken the waiting thread (251) includes posts to a work queue of its context, reception of a data communication directed to the context, and increasing space available for outgoing communications in output data communications resources of the context. Here the post function (480) posts a data communication instruction to a work queue of a context and then is improved to access a particular hardware memory location (376) before returning control to a calling application. The hardware memory location (376) is special. The hardware memory location (376) is associated by the operating system with the thread in the Wait state. Each record in Table (377) includes two fields, a thread identifier ('TID') (378) and an address (380) of a memory location whose access triggers a memory access interrupt. Memory controller (428) is configured with the addresses of memory location whose access is to trigger such an interrupt. When the post function (480) accesses the hardware memory location (376), the memory controller (428) triggers memory access interrupt (384), a hardware interrupt, which is vectored to interrupt handler (386) in the operating system (162). The interrupt (384) provides to the interrupt handler the address (380) of the accessed hardware memory location (376), which the handler (386) looks up in Table (377) to retrieve the thread identifier of the waiting thread (251). The interrupt handler (386) then awakens (422) the waiting thread (410), returning it to the Ready state (404) from which it will be dispatched (414) for execution on a processor.

As an alternative to awakening by a post, a data communication resource adapter (362), for example, a network adapter or a DMA controller, can access the special hardware memory location (376) and trigger the memory access interrupt (384). The data communication resource adapter (362) is represented here for ease of explanation as a generic adapter that can be implemented as an Ethernet adapter, a Fibre Channel adapter, an Infiniband adapter, a PCIe adapter, a DMA controller, and so on. The waiting thread (251) can have entered the Wait state because a receive buffer in the adapter (362) was empty and a send buffer in the adapter (362) was full—so that no further work could be advanced on its context even if there were pending data communications instructions in its work queue. In this case, an arrival in the receive buffer or increasing space available in the send queue for outgoing communications are both data communications events that awaken the waiting thread (251). The data communications adapter (362) is improved according to embodiments of the present invention to access the special hardware memory location (376) upon reception of a data communication direct to the advance function's context or upon an increase in space available for outgoing communications in the adapter. When the adapter accesses the hardware memory location (376), the memory controller (428) triggers memory access interrupt (384) which provides to the interrupt handler the address (380) of the accessed hardware memory location (376), which the handler (386) looks up in Table (377) to retrieve the thread identifier of the waiting thread (251). The interrupt handler (386) then awakens (422) the waiting thread (410), returning it to the Ready state (404) from which it will be dispatched (414) for execution on a processor.

Figure 12:
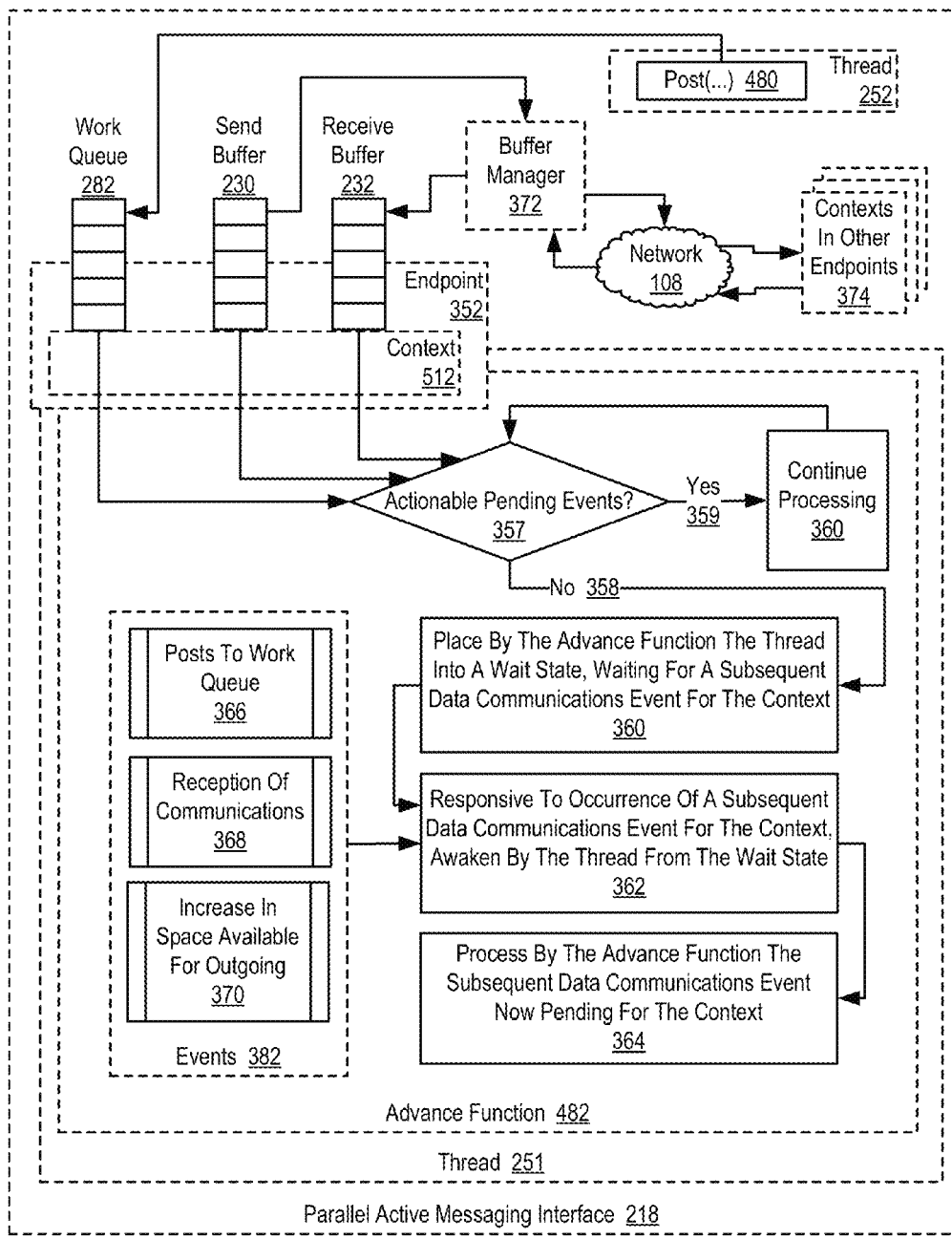
FIG. 12 sets forth a flow chart illustrating an example method of processing data communications events in a PAMI of a parallel computer according to embodiments of the present invention.

For further explanation, FIG. 12 sets forth a flow chart illustrating an example method of processing data communications events in a PAMI of a parallel computer according to embodiments of the present invention. The method of FIG. 12 is implemented in a PAMI (218) of a parallel computer composed of a number of compute nodes (102 on FIG. 1) that execute a parallel application, like those described above in this specification with reference to FIGS. 1-10. The PAMI (218) includes data communications endpoints (352, 374), with each endpoint specifying data communications parameters for a thread of execution on a compute node, including specifications of a client, a context, and a task, all as described above in this specification with reference to FIGS. 1-10. The endpoints are coupled for data communications through the PAMI (218) and through data communications resources (282, 230, 232, 108). The endpoints can be located on the same compute node or on different compute nodes.

The method of FIG. 12 includes determining (357) by an advance function (482) that there are no (358) actionable data communications events pending for its context (512). The advance function (482) is a member method of a context (512), and both the advance function (482) and its context (512) are components of an endpoint (352). The PAMI (218), as readers will by now recognize, conducts data communications among endpoint. The advance function executes in a thread (251) of execution on a compute node. The advance function, called on the context by an application or an application messaging module, makes the determination that there are no (358) actionable data communications events pending for its context (512) by checking its work queue (282) for pending data communications instructions and checking the data communications resources assigned to its context. In this example, the assigned data communications resources are a pair of communications buffers, a send buffer (230) and a receive buffer (232), connected to a data communications network (108) through a buffer manager (372), which is a module of automated computing machinery that sends data communications through the network (108) from the send buffer (230) to contexts in other endpoints (374) and places into the receive buffer (232) data communications received through the network (108) from other contexts in other endpoints (374).

Data communications events typically include posts to a work queue of a context, reception of a data communication directed to the context, and increases in space available for outgoing communications in output data communications resources of the context. So in this particular example, data communications events (382) include posts (366) to the work queue (282) of the context (512), reception (368) in the receive buffer (232) of data communication directed to the context (512), and increases (360) in space available in the send buffer (230) for outgoing communications from the context (512). A pending data communications event is an instruction in the work queue whose execution is not begun or remains incomplete, a newly arrived (not yet processed) communication in the receive buffer, or an increase in space available for outgoing communications that has not yet been utilized. Actionable pending data communications events are data communications instructions for which data communications resources are currently available and unprocessed communications in the receive buffer (232). The advance function determines (357, 358) that there are no actionable pending data communications events if there are no pending data communications instructions in the work queue (282) or there are pending data communications events in the work queue for which no space or inadequate space is currently available in the send buffer (230) and there are no unprocessed communications in the receive buffer (232). If there are actionable pending data communications events (357, 359) the advance function (482) continues (360) its usual work of processing the data communications events to advance the data communications work of its context until it eventually determines (357, 358) that there are no actionable pending data communications events.

In the example method of FIG. 12, upon determining (357, 358) that there are no actionable pending data communications events for its context, the advance function (482) places (360) its thread (251) of execution into a wait state, waiting for a subsequent data communications event for its context (512). The method of FIG. 12 also includes, responsive to an occurrence of a subsequent data communications event for its context, the thread's awakening (362) from the wait state and processing (364) by the advance function the subsequent data communications event now pending for the context. In an embodiment, the advance function re-enters the wait state after processing all subsequent data communications events to a point in processing where again there are no actionable pending events. In this way, a calling application can advance work on a context with only one call to an advance function on the context and know that all work on the context will be advanced, in effect a kind of fire-and-forget advance, instead of any requirement to call the advance again and again to advance data communications work on a context.

Figure 13:
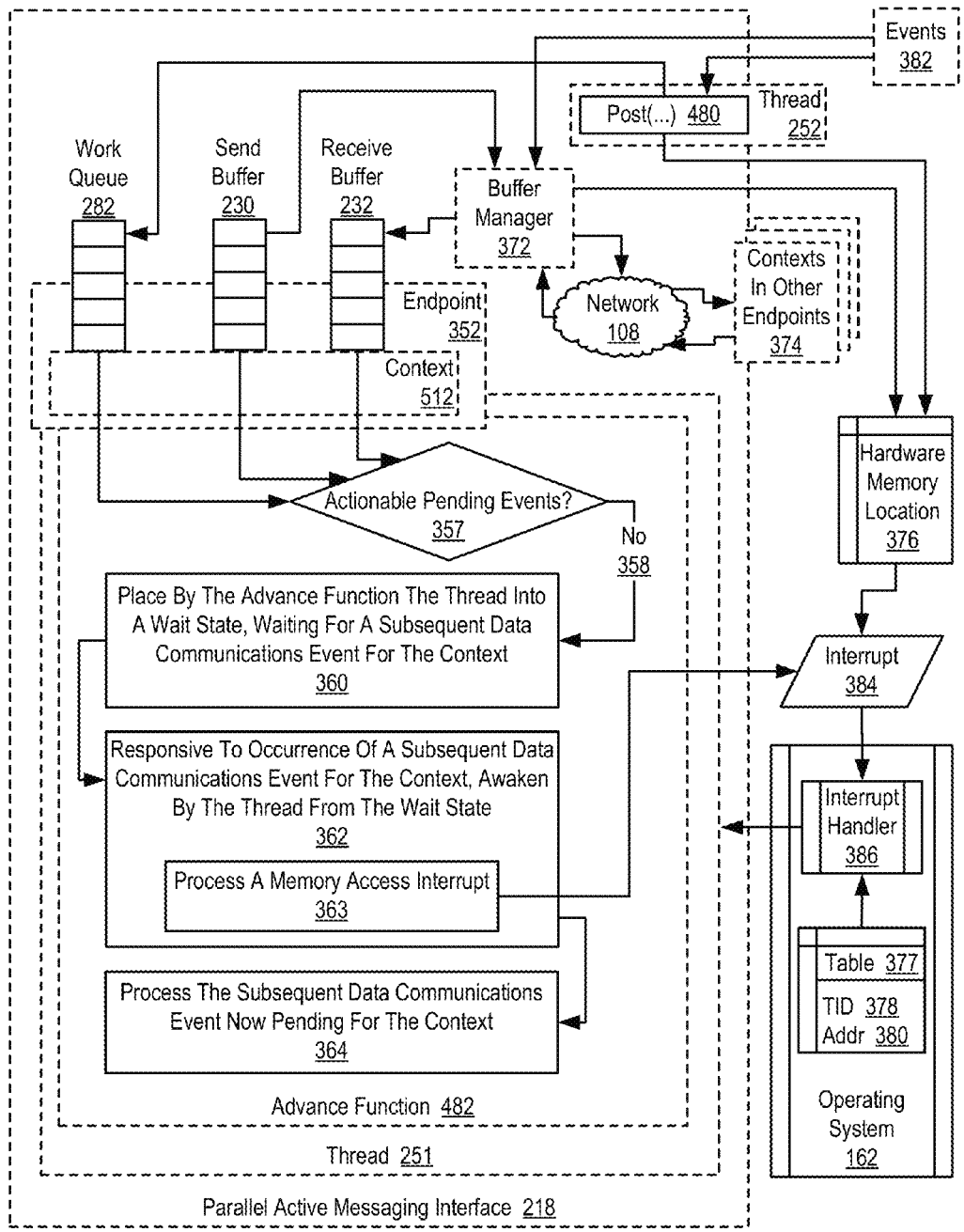
FIG. 13 sets forth a flow chart illustrating a further example method of processing data communications events in a PAMI of a parallel computer according to embodiments of the present invention.

For further explanation, FIG. 13 sets forth a flow chart illustrating a further example method of processing data communications events in a PAMI of a parallel computer according to embodiments of the present invention. The method of FIG. 13 is similar to the method of FIG. 12, including as it does determining (357) by an advance function (482) that there are no (358) actionable data communications events pending for its context (512), placing (360) the thread (251) into a wait state, awakening (362) from the wait state upon a subsequent data communications event, and processing (364) the subsequent data communications event. Like the method of FIG. 12, the method of FIG. 13 also is implemented in a PAMI (218) of a parallel computer composed of a number of compute nodes (102 on FIG. 1) that execute a parallel application, like those described above in this specification with reference to FIGS. 1-10.

In the method of FIG. 13, however, awakening (362) from the wait state includes processing (363) a memory access interrupt (386) that indicates an access of a hardware memory location (376) associated, by an operating system (162) of the parallel computer, with the thread (251) in the wait state. Here the operating system associates the thread (251) in the wait state with the hardware memory location (376) by means of a record in a table (377), each such record having a thread identifier ('TID') field and an address field (380). The thread identifier and address of an accessed hardware memory location are passed to the operating system by the advance function (482) when the advance function places the thread in the wait state by an operating system function such as, for example, wait(TID, Addr). The interrupt (384) advises an interrupt handler (386) of the address of the access hardware memory location (376), and the interrupt handler (386) uses the address (380) to look up the thread ID (378) in the table (377) and awaken the thread so identified.

Data communications events (382) that can awaken such a thread include posts of data communications instructions, SENDs, PUTs, GETs, and the like, to the work queue (282) of the context (512), reception in the receive buffer (232) of data communication directed to the context (512), and increases in space available in the send buffer (230) for outgoing communications from the context (512). A post function (480) in another thread, a thread (252) that is running rather than waiting, posts one or more instructions in the work queue (282) and then accesses the hardware memory location (376) generating the interrupt (384). The memory access can be any access, a read or a write. In an embodiment, the contents of the hardware memory location are used in data processing. In other embodiments, such an accessed hardware memory location is used only to generate memory access interrupts— with the contents of the hardware memory location treated as irrelevant to data processing. The buffer manager (372) receives into the receive buffer (232) a data communication through a network (108) from other endpoints (374) and then accesses the hardware memory location (376) generating the interrupt (384). And the buffer manager (372) transmits outgoing communications from the send buffer (230) out through the network (108), increasing the space available in the send buffer (230), and then accesses the hardware memory location (376) generating the interrupt (384).

Example embodiments of the present invention are described largely in the context of a fully functional parallel computer that processes data communications events in a PAMI. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing data communications events in a parallel active messaging interface ('PAMI') of a parallel computer, the parallel computer comprising a plurality of compute nodes that execute a parallel application,
the PAMI comprising data communications endpoints, each endpoint comprising a specification of data communications parameters for a thread of execution on a compute node, including specifications of a client, a context, and a task, the compute nodes and the endpoints coupled for data communications through the PAMI and through data communications resources, the method comprising:
determining by an advance function, the advance function comprising a member method of a context, the advance function executing in a thread of execution on a compute node, that there are no actionable data communications events pending for the context,
placing by the advance function the thread into a wait state, waiting for a subsequent data communications event for the context;
responsive to occurrence of a subsequent data communications event for the context, awakening by the thread from the wait state; and
processing by the advance function the subsequent data communications event now pending for the context.

2. The method of claim 1 wherein data communications events comprise posts to work queues of contexts, receptions of data communications directed to contexts, and increases in space available for outgoing communications in output data communications resources of contexts.

3. The method of claim 1 wherein awakening from the wait state comprises processing a memory access interrupt that indicates an access of a hardware memory location associated, by an operating system of the parallel computer, with the thread in the wait state.

4. The method of claim 1 wherein awakening from the wait state comprises processing a memory access interrupt that indicates an access, by a post function of the context executing in another thread, of a hardware memory location associated, by an operating system of the parallel computer, with the thread in the wait state.

5. The method of claim 1 wherein awakening from the wait state comprises processing a memory access interrupt that indicates an access, by a data communications buffer manager of the context, of a hardware memory location associated, by an operating system of the parallel computer, with the thread in the wait state.

6. The method of claim 1 wherein:
each client comprises a collection of data communications resources dedicated to the exclusive use of an application-level data processing entity;
each context comprises a subset of the collection of data processing resources of a client, context functions, and a work queue of data transfer instructions to be performed by use of the subset through the context functions operated by an assigned thread of execution; and
each task represents a process of execution of the parallel application.

7. The method of claim 1 wherein each context carries out, through post and advance functions, data communications for the parallel application on data communications resources in the exclusive possession of that context.

8. The method of claim 1 wherein each context carries out data communications operations independently and in parallel with other contexts.

* * * * *